US 12,483,524 B2

(12) United States Patent
He

(10) Patent No.: US 12,483,524 B2
(45) Date of Patent: Nov. 25, 2025

(54) MESSAGE PROCESSING METHOD AND APPARATUS, AND ELECTRONIC DEVICE

(71) Applicant: VIVO MOBILE COMMUNICATION CO., LTD., Dongguan (CN)

(72) Inventor: Cheng He, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 0 days.

(21) Appl. No.: 18/383,475

(22) Filed: Oct. 24, 2023

(65) Prior Publication Data

US 2024/0106770 A1 Mar. 28, 2024

Related U.S. Application Data

(63) Continuation of application No. PCT/CN2022/088951, filed on Apr. 25, 2022.

(30) Foreign Application Priority Data

Apr. 28, 2021 (CN) .......................... 202110469080.5

(51) Int. Cl.
H04L 51/04 (2022.01)

(52) U.S. Cl.
CPC .................................. H04L 51/04 (2013.01)

(58) Field of Classification Search
None
See application file for complete search history.

(56) References Cited

U.S. PATENT DOCUMENTS

| 10,805,247 | B1 | 10/2020 | Cohen et al. | |
| 2004/0049543 | A1* | 3/2004 | Kaminsky | H04L 51/04 |
| | | | | 709/204 |
| 2016/0062968 | A1* | 3/2016 | Umapathy | G06Q 10/10 |
| | | | | 715/752 |
| 2016/0065519 | A1 | 3/2016 | Waltermann et al. | |
| 2018/0295076 | A1* | 10/2018 | Wang | H04L 51/226 |
| 2020/0274844 | A1 | 8/2020 | Zhao et al. | |
| 2020/0336447 | A1* | 10/2020 | Hu | G06F 3/0482 |

FOREIGN PATENT DOCUMENTS

| CN | 1996959 A | 7/2007 |
| CN | 103472995 A | 12/2013 |
| CN | 106020595 A | 10/2016 |

(Continued)

OTHER PUBLICATIONS

Extended European Search Report issued in related European Application No. 22794826.0, mailed Sep. 23, 2024, 7 pages.

(Continued)

Primary Examiner — Tonia L Dollinger
Assistant Examiner — Ishrat Rashid
(74) Attorney, Agent, or Firm — IPX PLLC

(57) ABSTRACT

A message processing method and apparatus, and an electronic device, are provided. The message processing method includes: when a communication interface displays a first message, receiving a first input performed by a first user on the first message; and in response to the first input, displaying a second message on the communication interface, where the second message includes the first message and a reply message quoting a first message segment in the first message.

16 Claims, 15 Drawing Sheets

(56) References Cited

FOREIGN PATENT DOCUMENTS

| | | | | |
|---|---|---|---|---|
| CN | 108540646 A | 9/2018 | | |
| CN | 110187947 A | 8/2019 | | |
| CN | 110505142 A | 11/2019 | | |
| CN | 1111130818 A | 5/2020 | | |
| CN | 111835616 A | 10/2020 | | |
| CN | 113259222 A | * 8/2021 | ........... | G06Q 10/107 |
| JP | 2001216209 A | 8/2001 | | |
| JP | 2002091876 A | 3/2002 | | |
| JP | 2004320227 A | 11/2004 | | |
| JP | 2009064196 A | 3/2009 | | |
| JP | 2010152538 A | 7/2010 | | |
| JP | 2011146011 A | 7/2011 | | |
| JP | 2016018527 A | 2/2016 | | |

OTHER PUBLICATIONS

Notice of Reason for Refusal issued in related Japanese Application No. 2023-565452, mailed Sep. 10, 2024, 6 pages.
International Search Report issued in corresponding International Application No. PCT/CN2022/088951, mailed Jul. 25, 2022, 4 pages.
First Office Action issue in related Chinese Application No. 202110469080.5, mailed May 20, 2022, 9 pages.

* cited by examiner

FIG. 3

MESSAGE PROCESSING METHOD AND APPARATUS, AND ELECTRONIC DEVICE

CROSS-REFERENCE TO RELATED APPLICATIONS

This application is a continuation of International Application No. PCT/CN2022/088951, filed on Apr. 25, 2022, which claims the priority of Chinese Patent Application No. 202110469080.5, filed Apr. 28, 2021. The entire contents of each of the above-identified applications are expressly incorporated herein by reference.

TECHNICAL FIELD

This application is directed to the field of communication technologies, and specifically, to a message processing method and apparatus, and an electronic device.

BACKGROUND

With the development of communication technologies, there are more scenarios in which a user performs communication through communication software by using an electronic device. To facilitate effective communication between users through the electronic device, the communication software provides the user with a function of quoting and replying to an entire historical message sent by another user on a communication interface, and displays content replied below the entire historical message quoted by the user, so that the user easily knows which historical message the message is a reply message to.

However, when using the function of quoting and replying, the user needs to reply to the entire historical message, and a user who receives the reply message may not be able to accurately know an intention of the user who replies to the message, resulting in low conversational efficiency when the user replies to the message.

SUMMARY

Embodiments of this application is to provide a message processing method and apparatus, and an electronic device.

According to a first aspect, the embodiments of this application provide a message processing method. The method includes: when a communication interface displays a first message, receiving a first input performed by a first user on the first message; and in response to the first input, displaying a second message on the communication interface, where the second message includes the first message and a reply message quoting a first message segment in the first message.

According to a second aspect, the embodiments of this application provide a message processing method. The method includes: displaying a second message on a communication interface, where the second message is a message sent by a first message processing apparatus; when the second message includes M first reply identifiers, receiving a seventh input performed by a second user on a first reply identifier among the M first reply identifiers; and in response to the seventh input, displaying message content of a reply message indicated by the first reply identifier, where M is a positive integer, and the first reply identifier is used to indicate a reply message quoting one message segment.

According to a third aspect, the embodiments of this application provide a first message processing apparatus. The apparatus includes: a receiving module, configured to receive, where when a communication interface displays a first message, a first input performed by a first user on the first message; and a processing module, configured to display, in response to the first input received by the receiving module, a second message on the communication interface, where the second message includes the first message and a reply message quoting a first message segment in the first message.

According to a fourth aspect, the embodiments of this application provide a second message processing apparatus. The apparatus includes: a display module, configured to display a second message on a communication interface, where the second message is a message sent by a first message processing apparatus; and a receiving module, configured to receive, when the second message includes M first reply identifiers, a seventh input performed by a second user on a first reply identifier among the M first reply identifiers, where the display module is further configured to display, in response to the seventh input received by the receiving module, message content of a reply message indicated by the first reply identifier, where M is a positive integer, and the first reply identifier is used to indicate a reply message quoting one message segment.

According to a fifth aspect, an electronic device is provided in the embodiments of this application, including a processor, a memory, and a program or instructions stored in the memory and executable on the processor, where the program or instructions, when executed by the processor, implement/implements the steps of the message processing method according to the first aspect or the second aspect.

According to a sixth aspect, a readable storage medium is provided in the embodiments of this application, storing a program or instructions, where the program or instructions, when executed by a processor, implement/implements the steps of the message processing method according to the first aspect or the second aspect.

According to a seventh aspect, a chip is provided in the embodiments of this application, including a processor and a communication interface, where the communication interface is coupled to the processor, and the processor is configured to run a program or instructions, to implement the message processing method according to the first aspect or the second aspect.

In the embodiments of this application, after the electronic device displays the first message on the communication interface, the first user may perform an input on the first message. In this way, after receiving the first input performed by the first user on the first message, the electronic device may display the second message (the second message includes the message content quoting the first message and a reply message to the first message segment in the first message) on the communication interface, so that the first user may reply to part content of the first message (namely, the first message segment) in a targeted manner. In other words, the first user may reply to part content of the entire historical message including a large quantity of messages sent by another user in a targeted manner on a communication interface on which a conversation is performed. The user who reads the reply message may know an intention of the user who replies the message in a timely and accurate manner, and conversation efficiency when replying to the message by the user is improved.

BRIEF DESCRIPTION OF THE DRAWINGS

FIG. 3 is a second schematic diagram of a display interface of a message processing method according to an embodiment of the present application;

DETAILED DESCRIPTION

Figure 1:
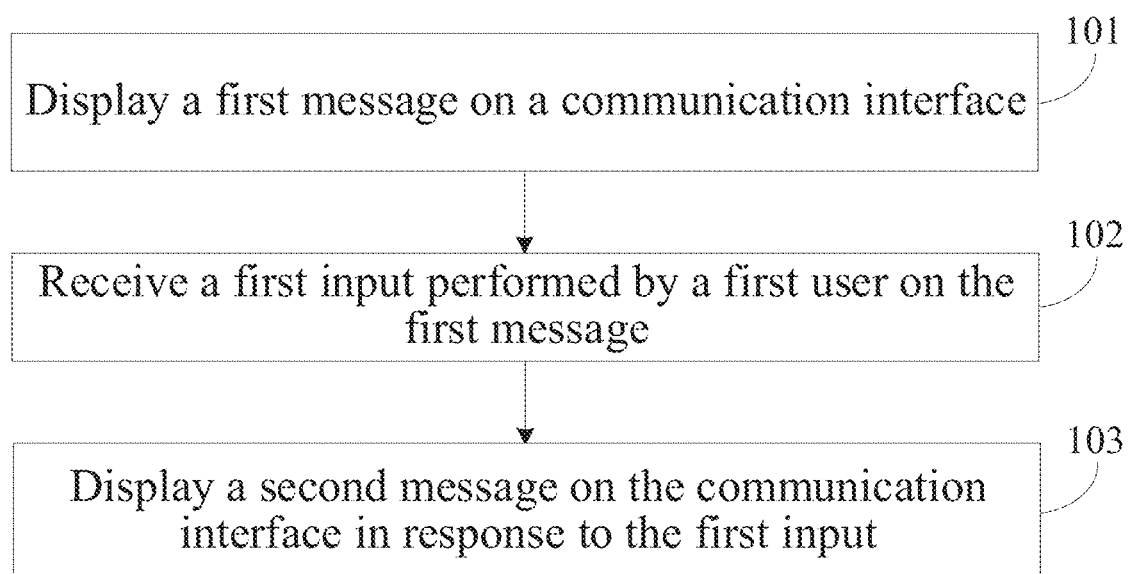
FIG. 1 is a first flowchart of a message processing method according to an embodiment of the present application.

The following describes the embodiments of the present application with reference to the accompanying drawings in the embodiments of the present application. Apparently, the described embodiments are some of the embodiments of the present application rather than all of the embodiments. All other embodiments Obtained by a person of ordinary skill in the art based on the embodiments of the present application without creative efforts shall fall within the protection scope of the present application.

The specification and claims of this application, and terms "first" and "second" are used to distinguish similar objects, but are unnecessarily used to describe a specific sequence or order. It may be understood that the data used in such a way is interchangeable in proper circumstances, so that the embodiments of this application can be implemented in other sequences than the sequence illustrated or described herein. In addition, in the specification and claims, "and/or" means at least one of the connected objects, and the character "/" generally indicates an "or" relationship between associated objects. The "plurality of" in the embodiments of the present application is at least two.

It is to be noted that in the embodiments of the present application, the word "exemplary" or "for example" is used to represent giving an example, an illustration, or a description. Any embodiment or design scheme described as an "exemplary" or "for example" in the embodiments of the present application should not be explained as being more preferred or having more advantages than another embodiment or design scheme. Exactly, use of the word "example," "for example," or the like is intended to present a related concept in a specific manner.

With the development of an electronic device such as a mobile phone and a personal computer, a social application program has been widely used by a user. The social application program may enable the user to communicate and interact with others conveniently in work or life. In related technologies, when the user wants to reply to a message sent by another user, the user may quote and reply to an entire historical message by using a function of quoting and replying.

It is to be noted that an execution entity of the technical solution provided in the embodiments of this application may be a message processing apparatus. The apparatus may be an electronic device, or may be a functional module and/or a functional entity in the electronic device. Details may be determined according to an actual use requirement. This is not limited in the embodiments of this application. To describe the message processing method provided in the embodiments of this application more clearly, in the following method embodiments, the execution entity of the message processing method is used as the message processing apparatus for exemplary description.

The following describes the message processing method of the embodiments of the present application with reference to FIG. 1 to FIG. 10.

FIG. 1 is a flowchart of a message processing method according to an embodiment of the present application. As shown in FIG. 1, the message processing method includes:

step 101: A first message processing apparatus displays a first message on a communication interface.

In the embodiments of this application, the first message may be a message being displayed by the first message processing apparatus on a first communication interface, or may be a historical message on the first communication interface.

In the embodiments of this application, the first message may be a message in the form of a text message, an emoticon message, or a picture message, or may be a message in the form of a mixture of the foregoing form, for example, a message in which text and a picture are mixed. Details may be determined according to an actual usage requirement, and this is not limited in the embodiments of the application.

In the embodiments of this application, the communication interface may be a group conversation communication interface, or a conversation communication interface between two users.

Step 102: The first message processing apparatus receives a first input performed by a first user on the first message.

In the embodiments of this application, the first message may be a message sent by another user except the first user, and the first message may also be a historical message sent by the first user before. For example, when the first user needs to further interpret some segments in the previously sent first message, the first message may be a message sent by the first user through the first message processing apparatus.

It may be understood that the first input may be an input performed by the first user on the first message. In other words, when the user performs the first input on the first message, the first message processing apparatus may consider that the user may need to select part of message content that needs to be quoted and replied to from the first message.

For example, the first input may be a touch input performed by the first user on the first message, or another feasible input. This is not limited in the embodiments of this application. For example, the first input may be one or more tap inputs performed by the first user on the first message on the communication interface, or may be a sliding input performed by the first user on the first message, or may be a touch-and-hold (for example, a press on the first message is greater than or equal to preset duration) input performed by the first user on the first message segment.

Step 103: The first message processing apparatus displays a second message on the communication interface in response to the first input.

The second message includes the first message and a reply message quoting a first message segment in the first message.

In the embodiments of this application, in response to the first input, the first message processing apparatus enters a "segment reply mode".

It is to be noted that in the "segment reply mode," the first user may continue to select the first message segment from the first message through another input, and reply to the first message segment in a targeted manner until all the first message segments are replied to.

For example, the first message processing apparatus may enter a new message reply interface for the first user to reply to a message of the first message segment, the first message processing apparatus may also continue to display the communication interface, and the first user may reply to the first message segment through an input box of the communication interface. In an example, after the first message processing apparatus enters the "segment reply mode," the first message processing apparatus may switch to a message reply interface for the first user to select the first message segment and enter a reply message to the first message segment. After all reply messages have been edited, the first message processing apparatus may generate a second message according to the reply message, and switch and display the second message to the communication interface.

Figure 2A:
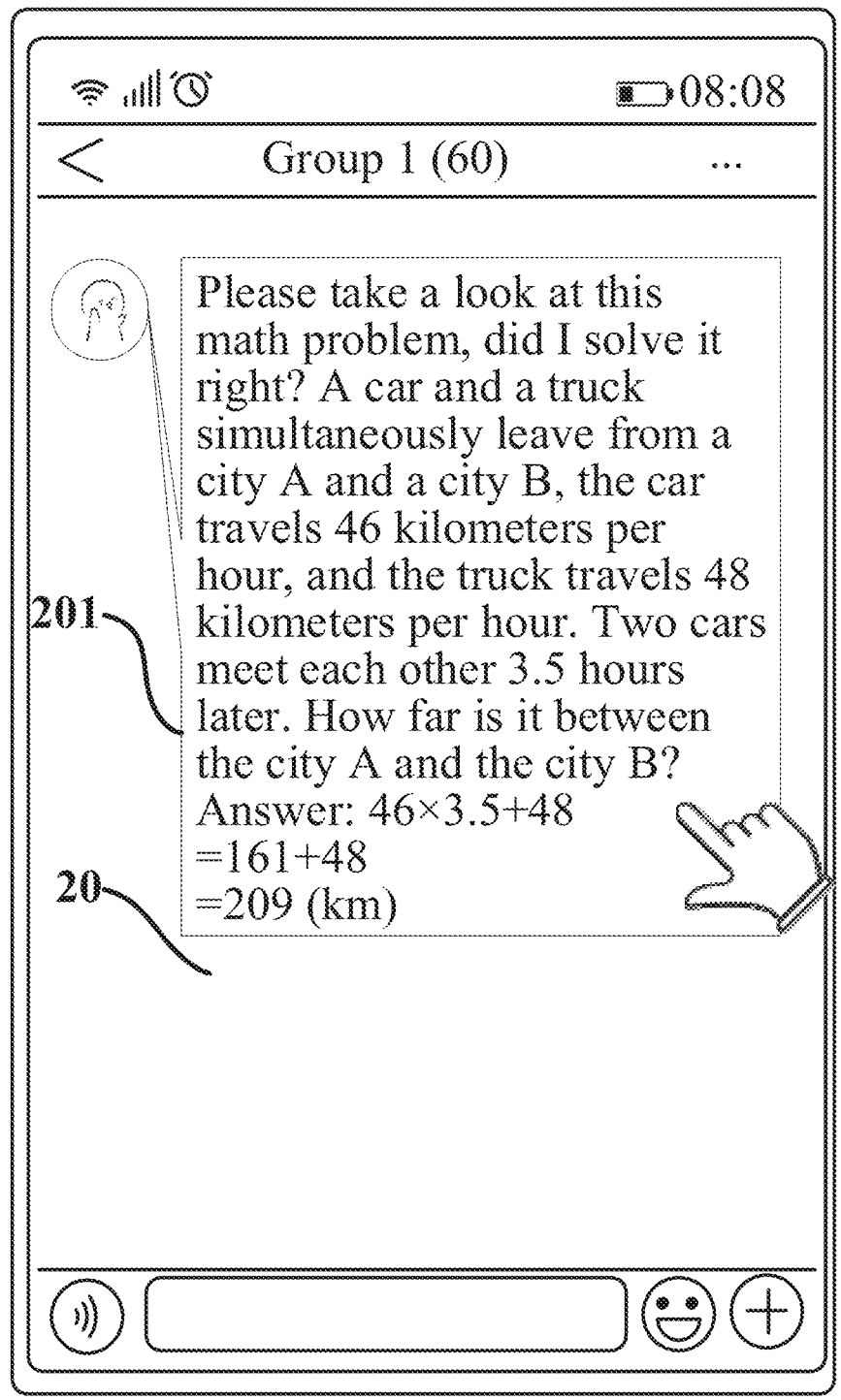
FIGS. 2A and 2B are first schematic diagrams of a display interface of a message processing method according to an embodiment of the present application.
Figure 2B:
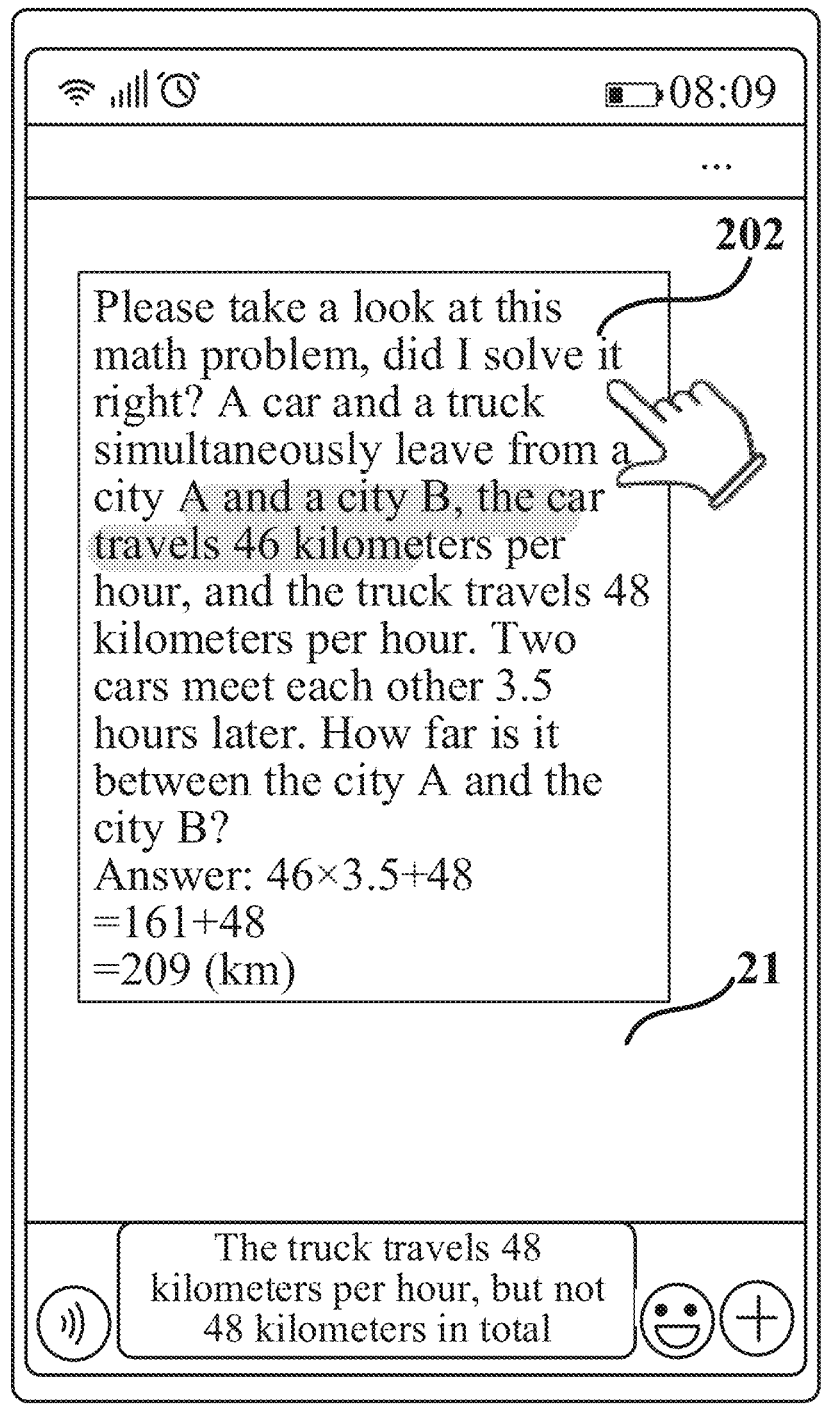

Further, in some implementations, the message reply interface may be a full-screen interface, which is convenient for the user to select the first message segment and enter the reply message. For example, as shown in FIG. 2A, an example in which a communication interface is a group chat interface of a "group 1" is used. After a user X (which may be the first user or another user except the first user) sends the first message 201, the first message 201 is displayed on the group chat interface 20. When the first user in the "group 1" wants to quote and reply some segment messages (such as "A truck travels 48 kilometers per hour") in the first message 201, the first user may select the first message 201 by performing a first input on the first message processing apparatus. As shown in FIG. 2B, the first message processing apparatus enters the "segment reply mode" in response to the first input, and switches and displays the message reply interface 21. Content of the first message 201 is displayed on the message reply interface 21. After the first user selects the first message segment 202 on the interface, the first user may enter a reply message "A truck travels 48 kilometers per hour, but not 48 kilometers in total" in the input box on the interface.

In an example, after the first message processing apparatus enters the "segment reply mode," the first message processing apparatus may also continue to display the communication interface. The first user may select a first message segment and enter a reply message to the first message segment on the communication interface.

For example, the second message includes the content of the first message, and the second message may have the same content and layout format as that of the first message. In other words, the second message does not change the content and layout of the first message, so that a user who reads the second message may know that there is an association relationship between the second message and the first message. The association relationship may be understood as that the second message is a message displayed for replying to the first message.

For example, the first message segment in the second message may be displayed differently in the second message. For example, the first message segment in the second message may be highlighted, displayed in a special color, displayed with emphasis, or the like, so that the first message segment may be displayed differently from other content displayed in the second message except the first message segment. In this way, the first user may accurately know which part of the content in the first message the reply message of the user quotes and replies to. For example, as shown in FIG. 2B, after the first user selects the first message segment 201, the first message segment 201 is displayed differently from other content, so that another user may know an object of the reply message edited by the first user.

Further, in some implementations, a first message segment in the second message is a first display mode, and the first display mode is used to indicate that the first message segment is quoted.

Figure 3:
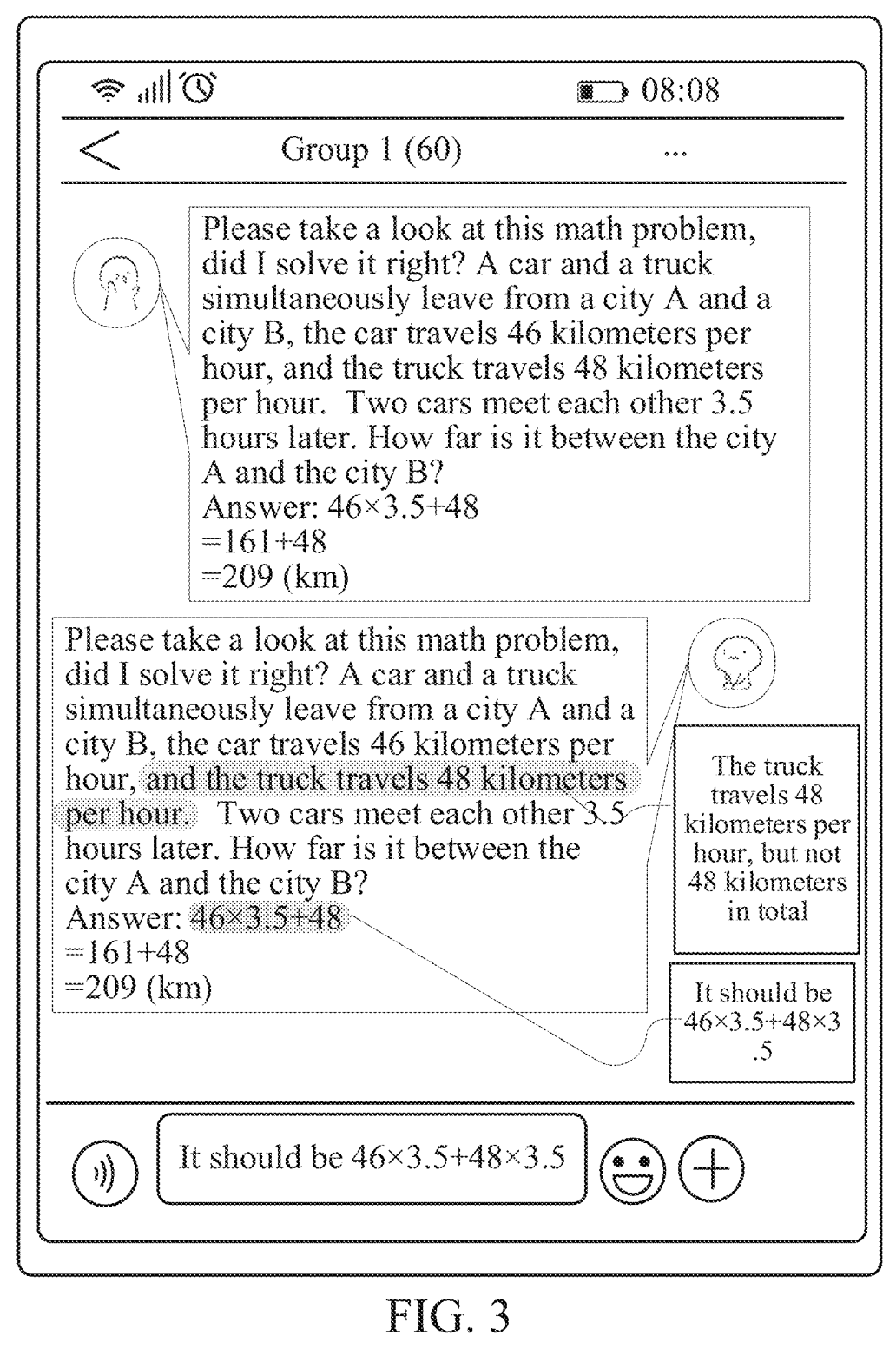

For example, the reply message in the second message may be directly displayed on the communication interface, and the mode of directly displaying the reply message is the first display mode, for example, the reply message is displayed on a side of the second message in the form of annotation. For example, as shown in FIG. 3, in response to the first input, the first message processing apparatus directly displays the reply message on the communication interface. Because when the reply message and the first message segment are displayed in an association manner, the user may read the reply message in a targeted manner, the reply message is displayed on the communication interface in the form of annotation. The annotation indicates that the first message segment is quoted by quoting the first message segment, and the message content of the reply message is "A truck travels 48 kilometers per hour, but not 48 kilometers in total" and "It should be 46×3.5+48×3.5" are displayed in an annotation box, so that another user may intuitively read content of all reply messages.

For example, in a second area of the second message, the message content of the reply message of the first message segment may be displayed. As shown in FIG. 3, the annotation box of the annotation is displayed on a right side of the second area and corresponds to a position of the first message segment, so that the user may compare the first message segment with the reply message to the first message segment.

In this way, the first message processing apparatus may directly display all the reply messages while displaying the second message, so that other users may read reply messages of the first user to all the first message segments in the first message.

Further, in some implementations, to enable the second message and the first message to have the same layout format, and to avoid the content of the message being too messy when the second message and the reply message are simultaneously displayed, affecting reading experience of other users, the reply message in the second message may also be indirectly displayed on the communication interface.

For example, if the reply message is indicated by displaying an identifier in the second message, the display manner is described in detail in step 104 and step 105 below. Therefore, details are not described herein again.

It is to be noted that identifiers in the embodiments of this application are used to indicate text, a symbol, an image, or the like of information, and controls or other containers may be used as carriers for displaying information, including but not limited to a text identifier, a symbol identifier, and an image identifier.

In the message processing method provided in the embodiments of this application, after the first message processing apparatus displays the first message on the communication interface, the first user may select some message content in the first message. In this way, after receiving the first input performed by the user on the first message, the first message processing apparatus may display the second message (the second message includes content quoting the first message and a reply message to the first message segment in the first message) on the communication interface, so that the first user may reply to part content of the first message (namely, the first message segment) in a targeted manner. In other words, the first user may send a reply to part content of the entire historical message including a large quantity of messages sent by another user in a targeted manner on a communication interface of a conversation. The user who reads the reply message may know an intention of the user replying the message in a timely and accurate manner, and conversation efficiency of the user when replying to the message is improved.

In some implementations, after the step 102, the message processing method provided in the embodiments of this application may further include the following step 104 or step 105:

Step 104: The first message processing apparatus receives a second input performed by a user on M first message segments in the first message.

For example, the first message segment may be part content of the first message.

For example, the first message segment may be a message in the form of a text message, an emoticon message, or a picture message.

For example, the first message segment may include one or more message segments in the first message. This is not limited in the embodiments of this application. The first message includes M first message segments (M is an integer greater than 1). Correspondingly, the reply message in the second message includes M reply messages, and one reply message corresponds to one first message segment selected by the first user.

It may be understood that the second input may be an input performed by the first user on the first message segment in the first message. In other words, when the user performs the second input on the first message segment, the first message processing apparatus may consider that the first user may need to reply to the first message segment targeted by the second input.

For example, the second input may be a touch input performed by the user on the second message, or another feasible input. This is not limited in the embodiments of this application. For example, the second input may be one or more tap inputs performed by the second user on the communication interface, or may be a sliding input performed by the second user on the second message, or may be a touch-and-hold (for example, duration of press on the second message is greater than or equal to preset duration) input performed by the second user on the second message segment.

Further, in some implementations, after the first message processing apparatus enters the "segment reply mode," the first message processing apparatus may continue to keep displaying the communication interface. The communication interface may be divided into a first display area and a second display area. The first message is displayed in the first display area, and the second display area is an editing area, and is used to display the second message being edited. When the communication interface further includes a message input window, step 104 in the message processing method provided in the embodiments of this application further includes step 1041, step 1042, step 1043, and step 1044:

Step 1041: A first message processing apparatus receives a first sub input performed by a first user on an first message segment in a first message.

i is a positive integer, and i≤M.

In the embodiments of this application, the first sub input may be an input performed by the first user to select a first message segment from the first message. A quantity of first sub inputs may be M, and the M first sub inputs are used to select M first message segments from the first message. The $i^{th}$ first sub input is used to select the $i^{th}$ first message segment from the first message.

Figure 4:
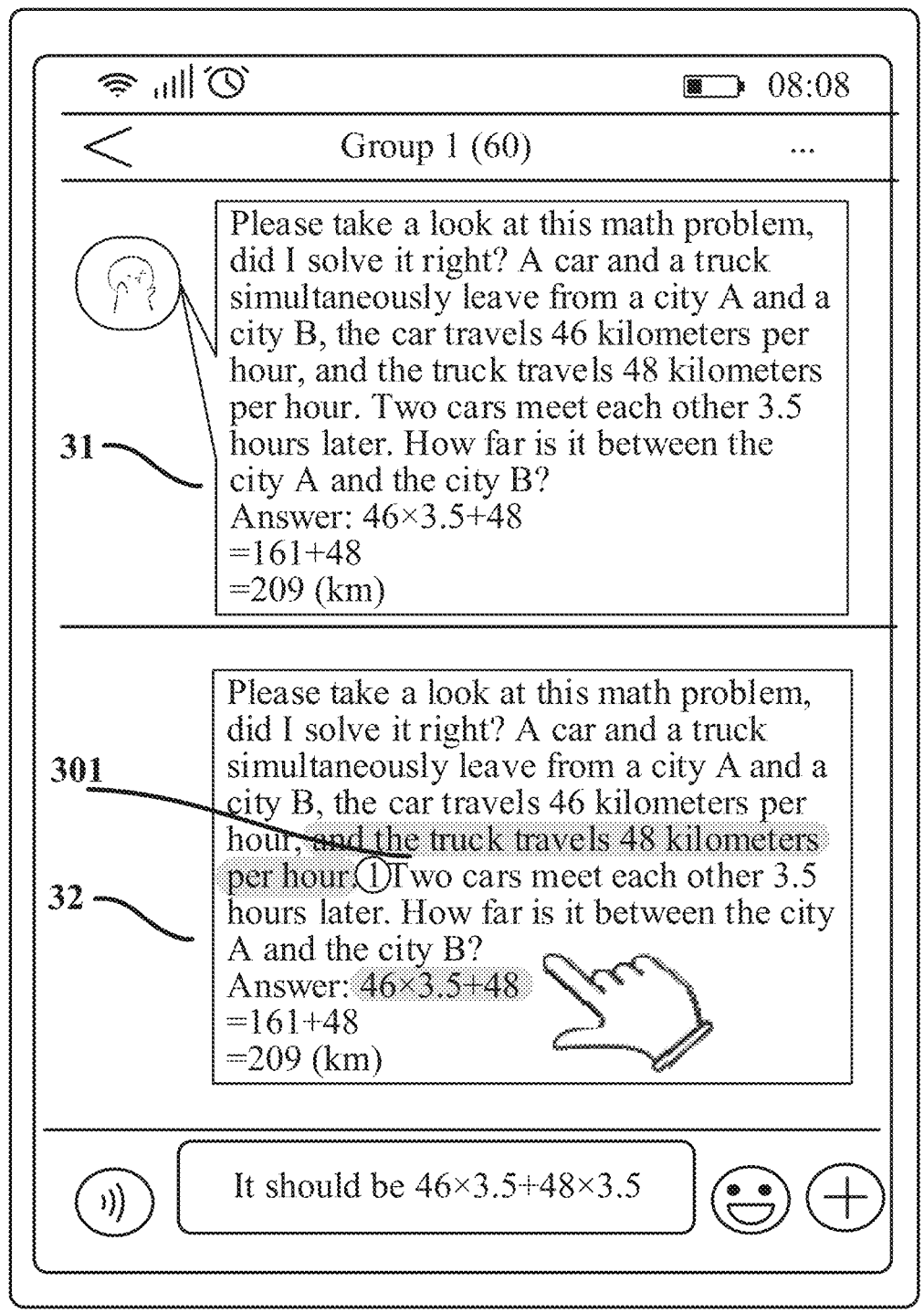
FIG. 4 is a third flowchart of a display interface of a message processing method according to an embodiment of the present application.

For example, as shown in FIG. 4, after the first message processing apparatus enters the "segment reply mode," the communication interface is divided into a first display area 31 and a second display area 32. The message content of the first message is displayed in the second display area 32, to help the first user edit the content of the first message. The first user performs a first sub input on "46×3.5+48," to select the first message segment that requires a targeted reply.

Step 1042: The first message processing apparatus updates the $i^{th}$ first message segment to a selected state in response to the $i^{th}$ sub input.

Further, in some implementations, the selected state may be a display state in which the first message segment is displayed differently from other content in the first message, such as highlighting, displaying in a special color, or displaying with emphasis the first message segment selected by the first sub input.

For example, as shown in FIG. 4, in response to the first message segment "46×3.5+48" selected by the first user through the first sub input, the first message processing apparatus updates the first message segment "46×35+48" to a highlighted display state in the second display area.

Step 1043: The first message processing apparatus receives a second sub input performed by the first user on a message input window.

The second sub input is used to input a reply message.

In the embodiments of this application, the second sub input may be an input performed by the first user to enter the reply message. A quantity of second sub inputs may be M, and the M second sub inputs are used to input reply messages to the M first message segments. The $i^{th}$ second sub input is used to input a reply message to the $i^{th}$ first message segment.

For example, as shown in FIG. 4, a message input window is displayed on the communication interface, and the first user may perform an input on a targeted reply message "It should be 46×3.5+48×3.5" in the message input window. The reply message is a reply message to the first message segment "46×3.5+48" selected by the first user through the $i^{th}$ first sub input.

Step 1044: The first message processing apparatus generates an $i^{th}$ first reply identifier in response to the second sub input.

The $i^{th}$ first reply identifier is generated based on the reply message and the $i^{th}$ message segment that are input performed by the second sub input.

In the embodiments of this application, after the first user enters a reply message through the second sub input, the first message processing apparatus generates a first reply identifier. The first reply identifier is used to indicate the reply message, so that the second message and the first message have the same layout format.

In the embodiments of this application, the $i^{th}$ first reply identifier, the $i^{th}$ first message segment, and the $i^{th}$ reply message have a one-to-one correspondence. The $i^{th}$ first reply identifier is used to indicate the $i^{th}$ reply message, and the $i^{th}$ reply message is used to reply to the $i^{th}$ first message segment.

It is to be noted that the first reply identifier may use a control or another container as a carrier for displaying information. It should be noted that the embodiments of the present application do not specifically limit a display form of the first reply identifier. Details may be determined according to an actual usage requirement.

In the embodiments of this application, a form of the first reply identifier includes but is not limited to a text identifier, a symbol identifier, and an image identifier.

Further, in some implementations, a display area of the first reply identifier may include one or a combination of messages such as a keyword of the reply message, a serial number, a user name of the first user, and a reply time point at which the message is replied. Any content of the reply message may also not be displayed in the display area of the first reply identifier.

For example, as shown in FIG. 4, the first message processing apparatus generates an $i^{th}$ first reply identifier 301 in response to the $i^{th}$ second sub input. The $i^{th}$ first reply identifier 301 is displayed on the second message being edited, and is used to indicate a reply message to the $i^{th}$ first message segment "A truck travels 48 kilometers per hour".

In this way, the first message processing apparatus may generate a first reply identifier in response to the first sub input and the second sub input performed by the first user. The first reply identifier is used to indicate the reply message to the first message segment. When the first reply identifier is used to indicate the reply message, a layout format of the second message may be clearer and more beautiful.

Step 105: The first message processing apparatus displays M first reply identifiers at a preset position on the communication interface in response to a second input.

The first reply identifier is used to indicate a reply message quoting one first message segment.

In the embodiments of this application, the first message processing apparatus displays the first reply message indicating the reply message in response to the second input performed by the first user, to implement a display effect of indirectly displaying the reply message in the first message, so that the second message may be clearly and neatly displayed on the communication interface.

For example, the first reply identifier may be displayed at a preset position on the communication interface, and the preset position may be a position associated with the first message segment. The preset position may be a position such as an upper right corner, an upper left corner, or an area on a side of the first message segment. For example, as shown in FIG. 4, the first reply identifier 301 is displayed at the upper right corner of the first message segment.

In this way, the first message processing apparatus may display the second message without changing a layout and content of the first message by displaying the first reply identifier to indicate the reply message, so that the second message and the first message have a display form of the same style, without causing confusion and incomprehension in the second message due to interspersed display of reply messages. In addition, when the first user or another user needs to view the reply message, the first user or the another user may perform a second input on the first reply identifier. The first message processing apparatus may display the reply message, so that the communication interface may be more tidy and clear. The user may accurately and timely know reply content of a targeted reply by the user to the first message, thereby improving conversation efficiency.

In some implementations, before the step 103, the message processing method provided in the embodiments of this application may further include the following step 106 or step 107:

Step 106: The first message processing apparatus receives a third input performed by a user.

The third input is used to indicate that reply messages of the M first message segment have been edited.

In the embodiments of this application, the first user may reply to the M first message segments in a targeted manner. When the first user edits all the reply messages of the M first message segments, the first user may indicate that the first user has edited the second message by entering a third input into the first message processing apparatus.

Further, in some implementations, the first message processing apparatus may display a control for generating the second message in an input window of the communication interface, to receive a third input performed by the first user. Certainly, the first message processing apparatus may also receive the third input performed by the first user in another form, for example, by receiving a sliding input performed by the first user conforming to a preset path, or receiving a floating gesture conforming to a preset gesture of the first user, which may implement an effect that the first message processing apparatus receives the third input performed by the first user. This is not limited in this application.

Figure 5:
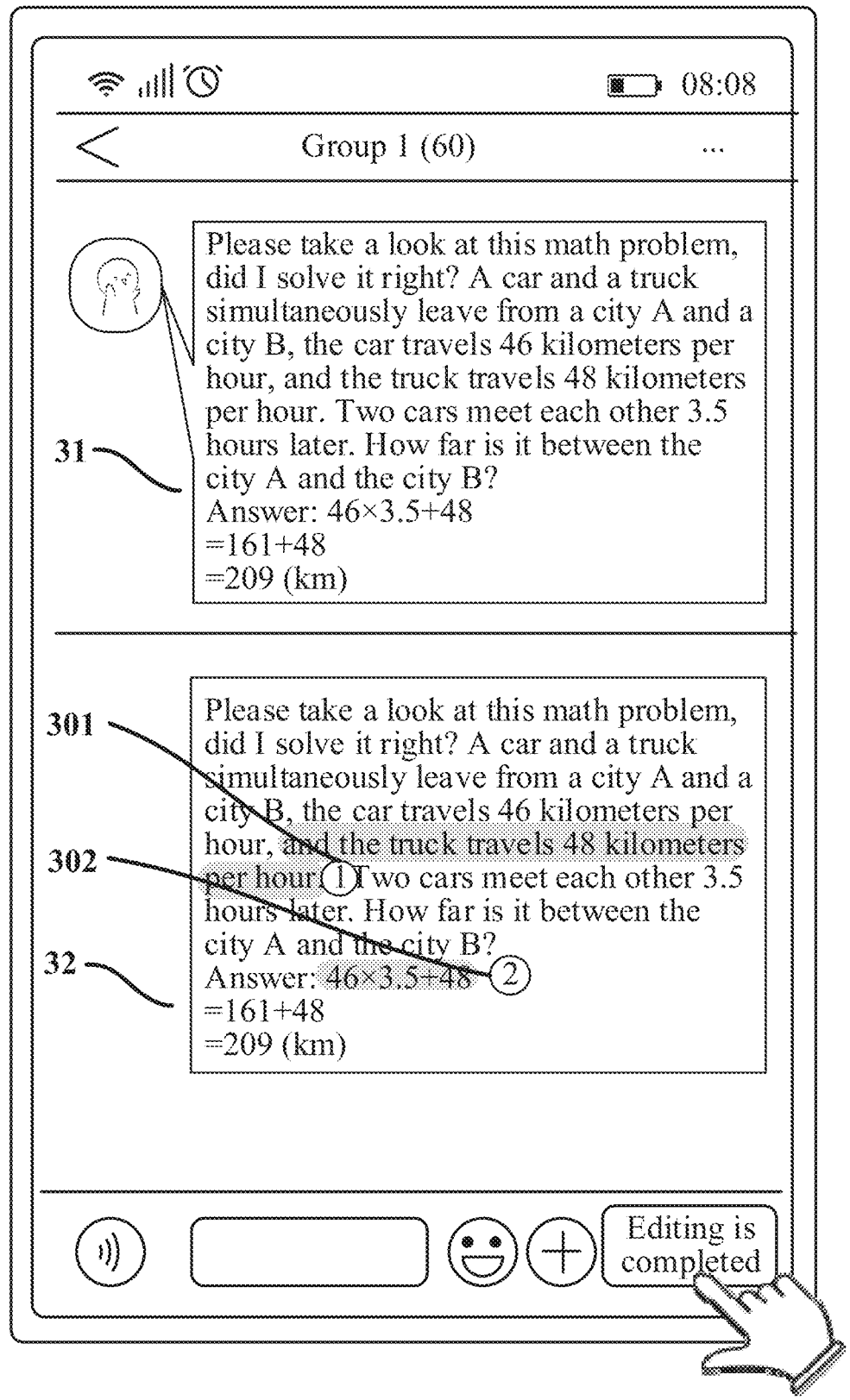
FIG. 5 is a fourth flowchart of a display interface of a message processing method according to an embodiment of the present application.

For example, as shown in FIG. 5, in the embodiments of this application, in the input window of the communication interface, a control for generating the second message is displayed. Content displayed in the control is "Editing has been completed," to prompt the first user to operate the control to generate the second message after editing the second message.

Step 107: The first message processing apparatus generates, in response to the third input, a second message according to the first message and the M first reply identifiers.

In the embodiments of this application, the first message processing apparatus sends the second message in response to the third input, where the second message is generated based on the content of the first message and the M first reply identifiers.

For example, as shown in FIG. 5, after the first user taps a control of "Editing has been completed and sent" through the third input, a second message is generated. The second message is generated according to the content of the first message and M first reply identifiers. The second message may include the content of the first message and two first reply identifiers (a first reply identifier 301 and a first reply identifier 302 respectively).

In this way, the first message processing apparatus generates the second message according to the first message and the M first reply identifiers in response to the third input of the second message that has been edited by the first user, so that the first user may reply to the M first message segments in a targeted manner, and generate the second message only after replying to all the M first message segments.

In some implementations, when the communication interface is a group conversation interface of the target group, after the step 107, the message processing method provided in the embodiments of this application further includes step 108 and step 109:

Step 108: The first message processing apparatus receives a fourth input performed by the first user.

In the embodiments of this application, the first user may select a first display attribute of the second message through the fourth input, and the first display attribute includes: the second message is visible to preset members among group members in the target group, or the second message is visible to all group members in the target group.

Further, in some implementations, the first message processing apparatus may display a control for selecting the first display attribute of the second message in an input window of the communication interface, to receive the fourth input performed by the first user. Certainly, the first message processing apparatus may also receive the fourth input performed by the first user in another form, for example, by receiving a sliding input performed by the first user conforming to a preset path, or receiving a floating gesture conforming to a preset gesture of the first user, which may implement an effect that the first message processing apparatus receives the fourth input performed by the first user. This is not limited in this application.

Step 109: The first message processing apparatus determines, in response to the fourth input, a first display attribute of the second message based on an attribute option selected by the fourth input.

Figure 6A:
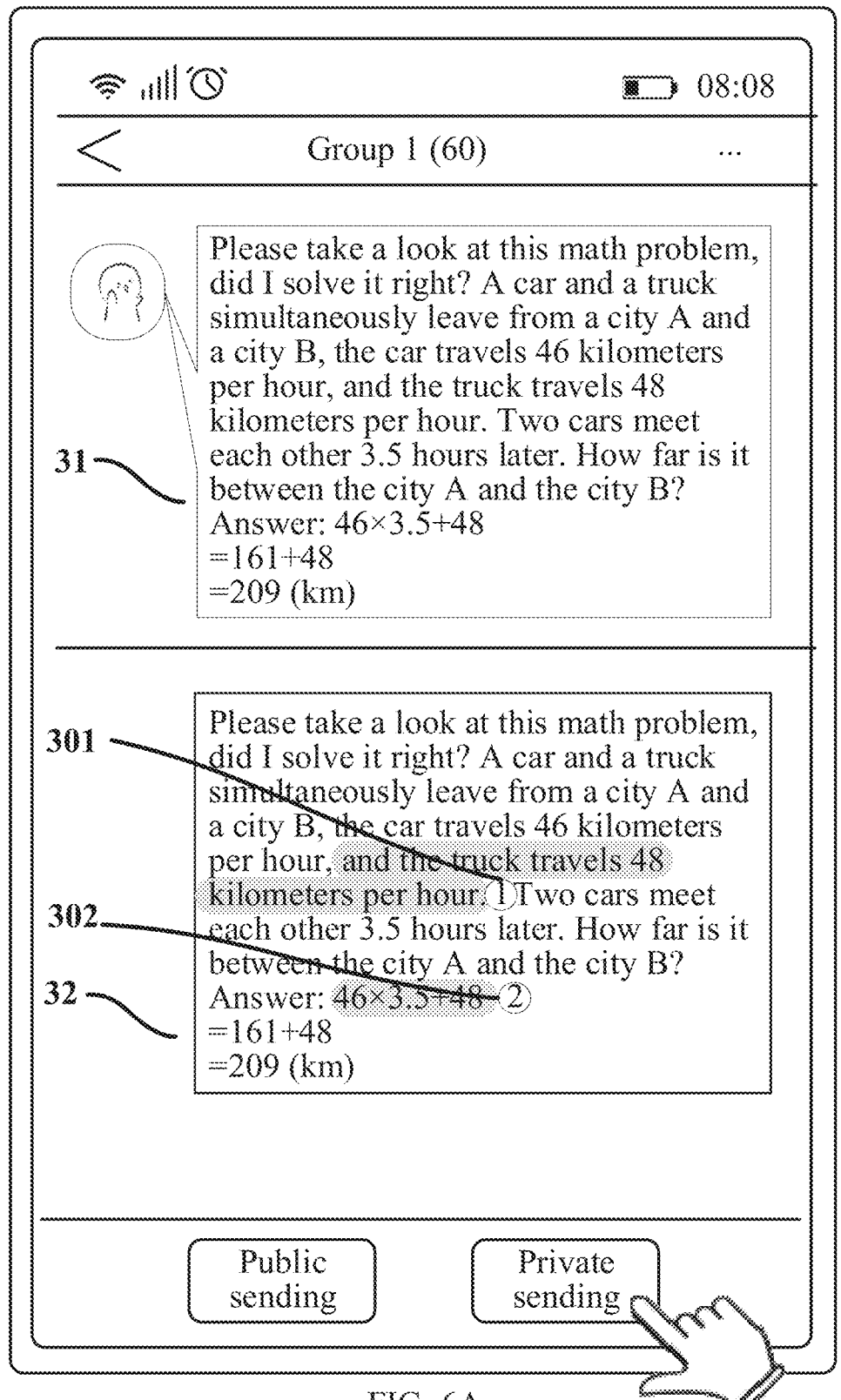
FIGS. 6A and 6B are fifth schematic diagrams of a display interface of a message processing method according to an embodiment of the present application.
Figure 6B:
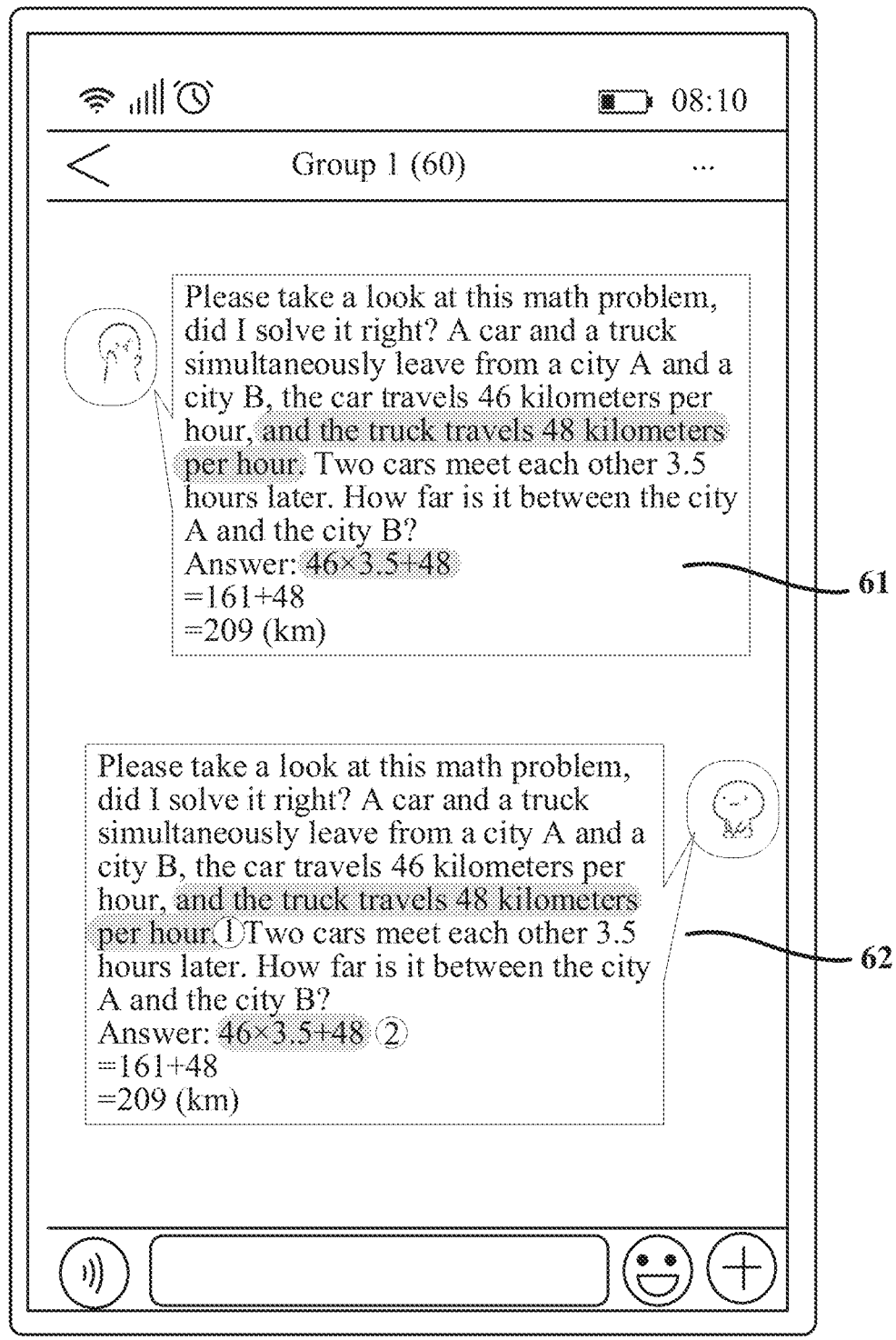

For example, as shown in FIG. 6A, the first message processing apparatus displays a "Private sending" control and a "Public sending" control that are used to select the first display attribute of the second message on the communication interface. After the first user enters the "Private sending" control or the "Public sending" control, the first message processing apparatus determines the first display attribute of the second message in response to the input. It may be understood that when the first message processing apparatus receives the input performed by the first user on the "Private sending" control, the second message is only visible to preset members. In other words, only sending devices of the members preset by the first user display the second message. When the first message processing apparatus receives the input performed by the first user on the "Public sending" control, the second message is visible to all members in the group. In other words, the second message is displayed on sending devices of all members in the group. As shown in FIG. 6B, when the first message processing apparatus receives the fourth input performed by the first user on the "Public sending" control, the first message processing apparatus sends the second message 62 to the communication interface. All the members in the target group may view the first message 61 and the second message 62 replying to the first message segment in the first message 61.

In an example, after the first message processing apparatus receives a fourth input performed by the first user on the first display attribute, when the first display attribute is that the second message is visible to the preset members among the group members in the target group. The first message processing apparatus may display a list of group members, so that the first user selects members who have permission to view the second message among the group members.

In an example, when the first display attribute of the second message is that the second message is visible to the preset members among the group members in the target group, the first message processing apparatus may separately send the second message to the preset members, according to selection of the preset members by the first user, or the first message processing apparatus sends the second message to a new group with only the preset members according to selection of the preset members by the first user.

In this way, by providing the first display attribute of the second message, the first message processing apparatus may enable the first user to select a specific user to read the second message including the reply message according to the content of the reply message, to be specific, to limit a reading object of the second message. On the one hand, a privacy requirement when quoting the reply is guaranteed, and on the other hand, other users who are not interested in the second message on the group communication interface are not disturbed when the second message is displayed.

In some implementations, when the communication interface is a group conversation interface of the target group, after the step 107, the message processing method provided in the embodiments of this application further includes step 110 and step 111:

Step 110: The first message processing apparatus receives a fifth input performed by the first user on a target message segment among the M first message segments.

In the embodiments of this application, the fifth input may be an input performed by the first user to trigger the first message processing apparatus to select the target message segment. When the user performs the fifth input on the second message that has been edited, the first message processing apparatus may determine that the first user may need to determine a second display attribute of the reply message corresponding to the target message segment.

It may be understood that the target message segment is one or more first message segments from the M first message segments through the fifth input performed by the first user.

For example, the fifth input may be one or more tap inputs performed by the first user on the target message segment, or may be a sliding input performed by the first user on the target message segment, or may be a touch-and-hold input performed by the first user on the target message segment. Details may be determined according to an actual usage requirement. This is not limited in the embodiments of the present application.

Step 111: The first message processing apparatus determines a second display attribute of the first target reply identifier corresponding to a target message segment in response to the fifth input, or determines a second display attribute of message content of a reply message corresponding to a target message segment.

The second display attribute includes: the first target reply identifier or the message content of the reply message is visible to the preset members among the group members in the target group, or the first target reply identifier or the message content of the reply message is visible to all the group members in the target group.

In an example, the reply message in the second message may be directly displayed on the communication interface. For example, the reply message may be displayed on a side of the second message in the form of annotation. In this case, the first message processing apparatus may determine the second display attribute of the reply message of the target message segment in response to the fifth input performed by the first user. If the second display attribute is visible to the preset members among the group members in the target group (privacy display), only members preset by the first user may view the reply message. If the second display attribute is visible to all the members among the group members in the target group (public display), all the members in the target group may view the reply message.

It is to be noted that M first message segments match M reply messages. According to an actual need, the first user may select second display attributes of some reply messages in the second message as private display, and select a display attribute of another reply message as public display.

In an example, the first reply identifier is displayed in the second message, and the reply information of the first message segment is indicated by the first reply identifier. In this case, the first message processing apparatus may determine the second display attribute of the first target reply identifier corresponding to the target message segment in response to the fifth input performed by the first user. If the second display attribute is visible to the preset members among the group members in the target group (privacy display), members preset by the first user may view the first target reply identifier. If the second display attribute is visible to all the group members in the target group (public display), all the members in the target group may view the first target reply identifier.

It is to be noted that because the display attribute of the first target reply identifier is displayed in privacy, the reply message indicated by the first target reply identifier is also displayed in privacy, and only the preset members in the target group may view the identifier. Members except the preset members in the target group cannot view the identifier and thus cannot read the reply message indicated by the first target reply identifier, so that the display message is kept secret from non-preset members.

In this way, the first message processing apparatus may enable the first user to set the reading permission for different users to different reply messages according to different content of a plurality of reply messages by determining the first target reply identifier corresponding to the target message segment or the second display attribute of the message content of the reply message corresponding to the target message segment. The first user may select preset members in the group and other members to read different quantities of reply messages, which limits reading objects of some reply messages in the second message, and further meets a privacy requirement of the first user when performing quoting and replying.

In some implementations, after the step 103, the message processing method provided in the embodiments of this application further includes step 112 and step 113:

Step 112: The first message processing apparatus receives a sixth input performed by the first user on a first reply identifier.

In the embodiments of this application, the sixth input may be an input performed by the first user to trigger the first message processing apparatus to display the reply message. In other words, when the user performs the sixth input on the first message processing apparatus, the first message processing apparatus may determine that the first user may need to view the reply message.

For example, the second input may be one or more tap inputs performed by the first user on the first reply identifier on the communication interface, or may be a sliding input performed by the first user on the first reply identifier, or may be a touch-and-hold (for example, duration of press on the first reply identifier is greater than or equal to preset duration) input performed by the first user on the first reply identifier, or may be other feasible operations performed by the first user on the first reply identifier. Details may be determined according to an actual usage requirement. This is not limited in the embodiments of the present application.

Step 113: The first message processing apparatus displays, in response to the sixth input, message content of a reply message indicated by the first reply identifier in a first area of the second message.

For example, the reply message may be displayed on the communication interface, and displayed in a first area of the second message. The first area may be a side area of the second message and correspond to a corresponding position of the first message segment.

In this way, the first message processing apparatus indicates the reply message by displaying the first reply identifier. When the first user needs to view the reply message in the second message sent before, the sixth input may be performed on the first reply identifier in the second message. The first message processing apparatus displays the reply message, thereby improving conversation efficiency.

Figure 7:
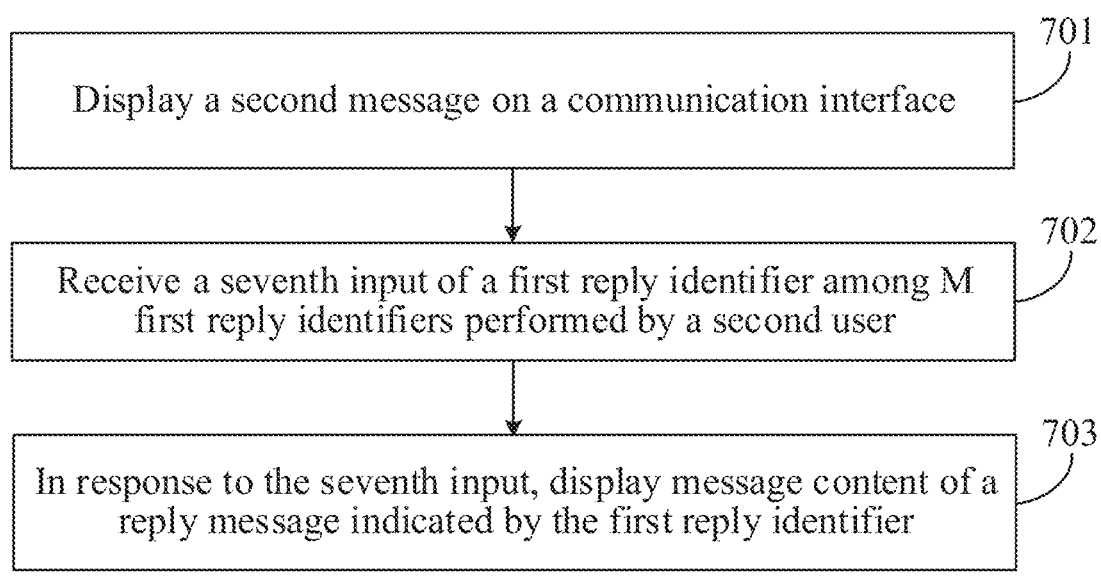
FIG. 7 is a second flowchart of a message processing method according to an embodiment of the present application.

FIG. 7 is a flowchart of a message processing method according to an embodiment of the present application. As shown in FIG. 7, the display method includes:

step 701: A second message processing apparatus displays a second message on a communication interface.

The second message is a message sent by a first message processing apparatus.

In the embodiments of this application, the second message segment may be a message in the form of a text message, an emoticon message, or a picture message, or may be a message in the form of a mixture of the foregoing form, for example, a message in which text and a picture are mixed. Details may be determined according to an actual usage requirement, and this is not limited in the embodiments of the application.

In the embodiments of this application, the communication interface may be a group conversation communication interface, or a communication interface between two users.

Step 702: When the second message includes M first reply identifiers, the second message processing apparatus receives a seventh input performed by a second user, on a first reply identifier among the M first reply identifiers.

M is a positive integer.

In the embodiments of this application, the first reply identifier is used to indicate a reply message of one first message segment.

In the embodiments of this application, the second message includes the M first reply identifiers, and the second user may select one first reply identifier among the M first reply identifiers to perform the seventh input, to select to view the reply message indicated by the first reply identifier.

Step 703: The second message processing apparatus displays, in response to the seventh input, message content of a reply message indicated by the first reply identifier.

For example, the seventh input may be one or more tap inputs performed by the second user on the first reply identifier on the communication interface, or may be a sliding input performed by the user on the first reply identifier, or may be a touch-and-hold (for example, duration of press on the first reply identifier is greater than or equal to preset duration) input performed by the user on the first reply identifier, or may be other feasible operations performed by the user on the first reply identifier. Details may be determined according to an actual usage requirement. This is not limited in the embodiments of the present application.

For example, the reply message may be displayed on the communication interface, and the reply message may be displayed on a side of the message with the same content as the first message.

Figure 8:
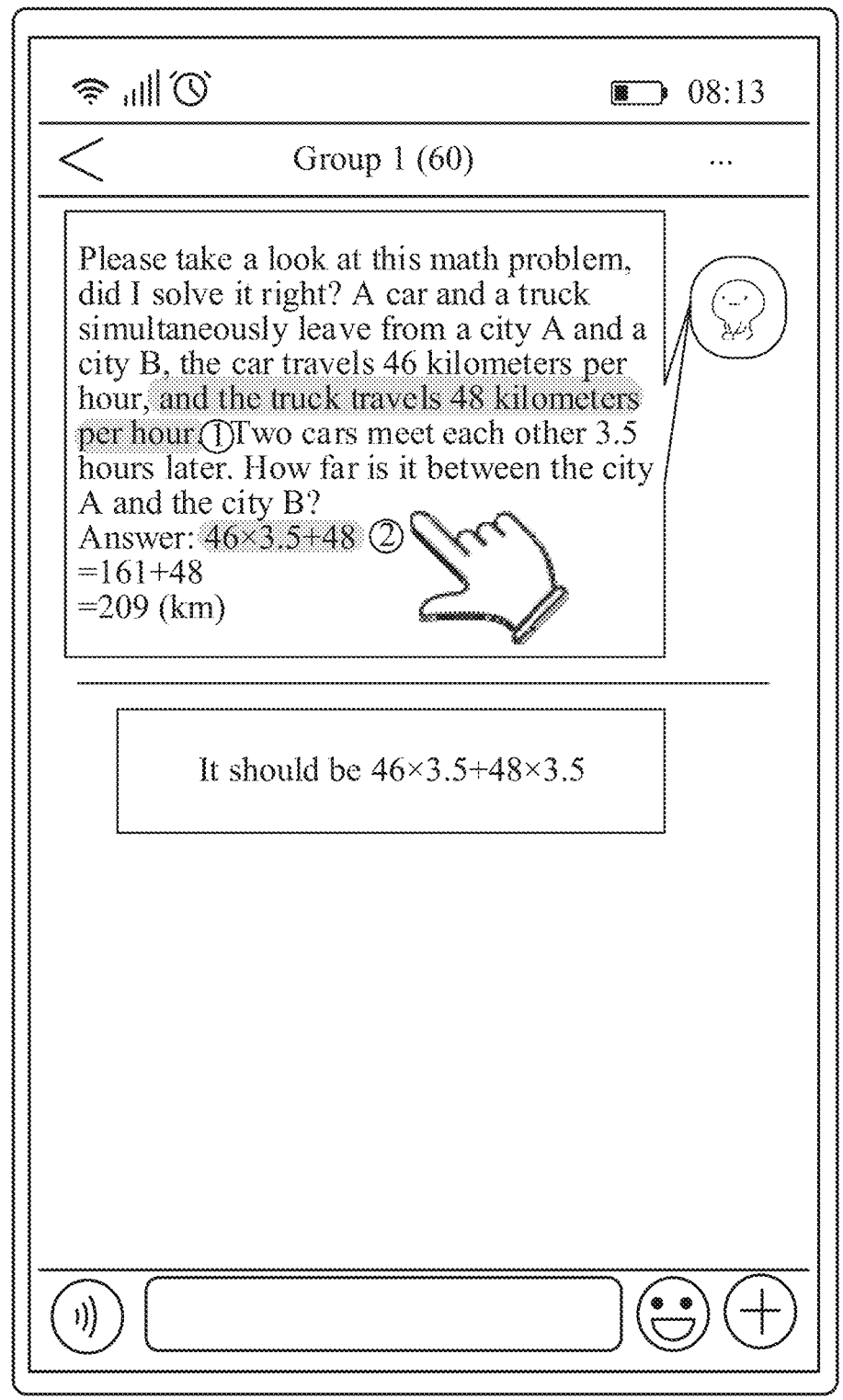
FIG. 8 is a sixth flowchart of a display interface of a message processing method according to an embodiment of the present application.

In an example, the reply message may be displayed on the communication interface of the second message processing apparatus to display the reply message. For example, as shown in FIG. 8, the second message processing apparatus, in response to an input performed by the second user on a first reply identifier ② on the communication interface, displays a reply message "It should be 46×3.5+48×3.5" indicated by the first user by tapping the first reply identifier ② under a second message on the communication interface.

In an example, the reply message may be displayed on the interface displayed after the second message processing apparatus passes through a switching interface. For example, the second message processing apparatus, in response to an input performed by the second user on the first reply identifier on the communication interface, switches the current interface to a new message display interface, and displays the reply message indicated by the first user through the first reply identifier on the message display interface.

In the message processing method provided in this application, the second message processing apparatus may display the second message without changing the layout and content of the first message by displaying the first reply identifier to indicate the reply message, so that when the second user needs to view the reply message, the second user may perform a seventh input on the first reply identifier. The second message processing apparatus displays the reply message, so that the communication interface may be more tidy and clear. The second user may accurately and timely know reply content of a targeted reply by the first user to the first message, thereby improving conversation efficiency.

In some implementations, after the step 701, the message processing method provided in the embodiments of this application may further include step 704 and step 705:

Step 704: The second message processing apparatus receives an eighth input performed by the second user on a second message.

It may be understood that the eighth input may be an input performed by the second user on the second message. In other words, when the second user performs the eighth input on the second message, the second message processing apparatus may consider that the second user may need to select some message content that needs to be quoted and replied to from the second message.

Step 705: The second message processing apparatus displays a third message on the communication interface in response to the eighth input.

The third message includes the second message and a reply message quoting a second message segment in the second message.

In the embodiments of this application, in response to the eighth input, the second message processing apparatus enters a "segment reply mode." It is to be noted that for a process in which the second user enters the "segment reply mode" to edit the third message through the second message processing apparatus, reference may be made to the process in which the first user edits the second message through the first message processing apparatus. Because the process has been described in detail above, this is not described herein again.

For example, the content of the second message segment may be the same as the content of the first message segment. In other words, the second user may continue to further quote and reply to the message segment in the second message that is quoted and replied to. The content of the second message segment may also be different from the content of the first message segment, and the second user may reply to another to-be-replied message segment in a targeted manner based on the second message.

Figure 9:
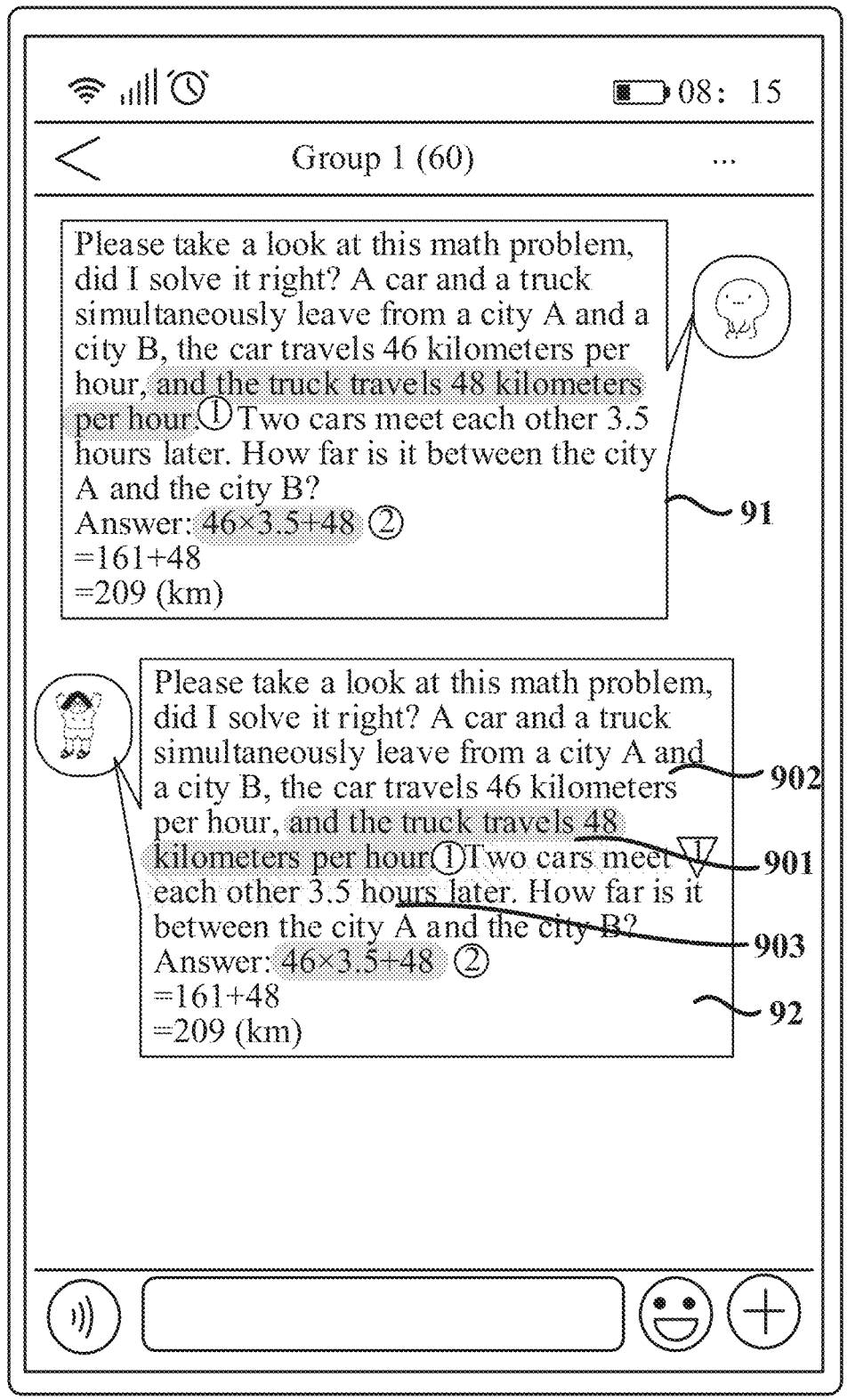
FIG. 9 is a seventh schematic diagram of a display interface of a message processing method according to an embodiment of the present application.

For example, as shown in FIG. 9, when the second user wishes to reply to the content that the first user has not quoted, the second user may select a second message segment 901 from a second message 92. Content of the second message segment 901 is different from content of the first message segment 902 and content of the first message segment 903. It may be understood that if the second user wishes to continue to quote the first message segment 902 and the second message segment 903, the second user may continue to quote the first message segment 902 or the first message segment 903 in the second message 92.

For example, the second message segment may also only include one first message segment. The second user may also select N segments in the second message to reply to respectively, and the second message may include N second message segments, where N is an integer greater than or equal to 1.

For example, the third message and the second message may have the same content and layout format. In other words, the third message does not change the content and layout of the second message, so that the user who reads the third message may know that there is an association relationship between the third message and the second message. The association relationship may be understood as that the third message is a message displayed for replying to the second message.

For example, the third message may include the message content of the second message, and further include a reply message to the second message segment in the second message. The second message includes the first message and a reply message to the first message segment. In other words, the third message includes all reply messages of different users to the first message.

For example, as shown in FIG. 9, a third message 92 is displayed on the communication interface, the third message 92 includes the content in the second message 91, and a format of the third message 92 is the same as a format of the second message 91, so that other users may clearly know that the third message 92 is a reply message that quotes and replies to part content of the second message 91. In addition, the third message not only includes the reply message of the first user in the second message, but also includes the reply message edited by the third user. Therefore, the third message comprehensively includes all reply messages to the first message by different users, so that other users do not need to view other messages, and may know all the reply messages to the first message by different users by only viewing the third message.

In this way, the second user may quote and reply to the second message again by editing the third message. After the second message processing apparatus displays the third message on the first communication interface, because the third message not only includes the reply message of the second user to the second message segment, but also includes the reply message of the first user to the first message segment, to help other users view all reply messages to the same message (the first message in the embodiments of this application) by viewing the third message.

When the user needs to view the quote reply message to the first message, there is no need to view a plurality of independent and unrelated messages, the operation is convenient, and the conversation efficiency is improved.

In some implementations, the third message includes a second reply identifier, the second reply identifier is used to indicate the reply message quoting the second message segment, and the second reply identifier and the first reply identifier are in different display modes.

For example, a reply message of the second user to the second message segment may be included in the third message in a manner indicated by the second reply identifier.

In an example, the second reply identifier may be displayed in the third message in the form of a floating control. It should be noted that the embodiments of the present application do not limit a display form of the floating control. Details may be determined according to an actual usage requirement. For example, the display form may include a shape and a size.

In an example, a display area of the second reply identifier may include one or a combination of messages such as a keyword of the reply message, a serial number, a user name, and a reply time point at which the message is replied. Any content of the reply message may also not be displayed in the display area of the second reply identifier.

In an example, the second reply identifier may be displayed differently from the first reply identifier. The form of displaying differently may include one or a combination of the following manners: the first reply identifier and the second reply identifier are located in different display areas, the first reply identifier and the second reply identifier are displayed in different colors, the first reply identifier and the second reply identifier are displayed in different shapes, or other reply messages that may help the user know that different reply messages are output by different users through different message processing apparatuses.

In this way, the second message processing apparatus displays the first reply identifier and the second reply identifier differently. It is convenient for the user to know that the reply messages of different users are output by different users. When the user needs to view a reply message of a user, the user may enter the first reply identifier or the second reply identifier, so that the user may know reply content of different users to different message segments as required, thereby improving the conversation efficiency.

In some implementations, after the step 705, the message processing method provided in the embodiments of this application may further include step 706 and step 707:

Step 706: The second display apparatus receives a ninth input performed by the second user on a third message.

In the embodiments of this application, the ninth input may be an input performed by the second user to trigger the second message processing apparatus to display different reply identifiers in different areas. When the second user performs the ninth input on the third message that has been edited, the second message processing apparatus may determine that the second user may need to display the first reply identifier and the second reply identifier in different areas.

Step 707: The second message processing apparatus displays, in response to the ninth input, according to a user corresponding to the reply message, the first reply identifier and the second reply identifier in the second message in different areas.

Figure 10:
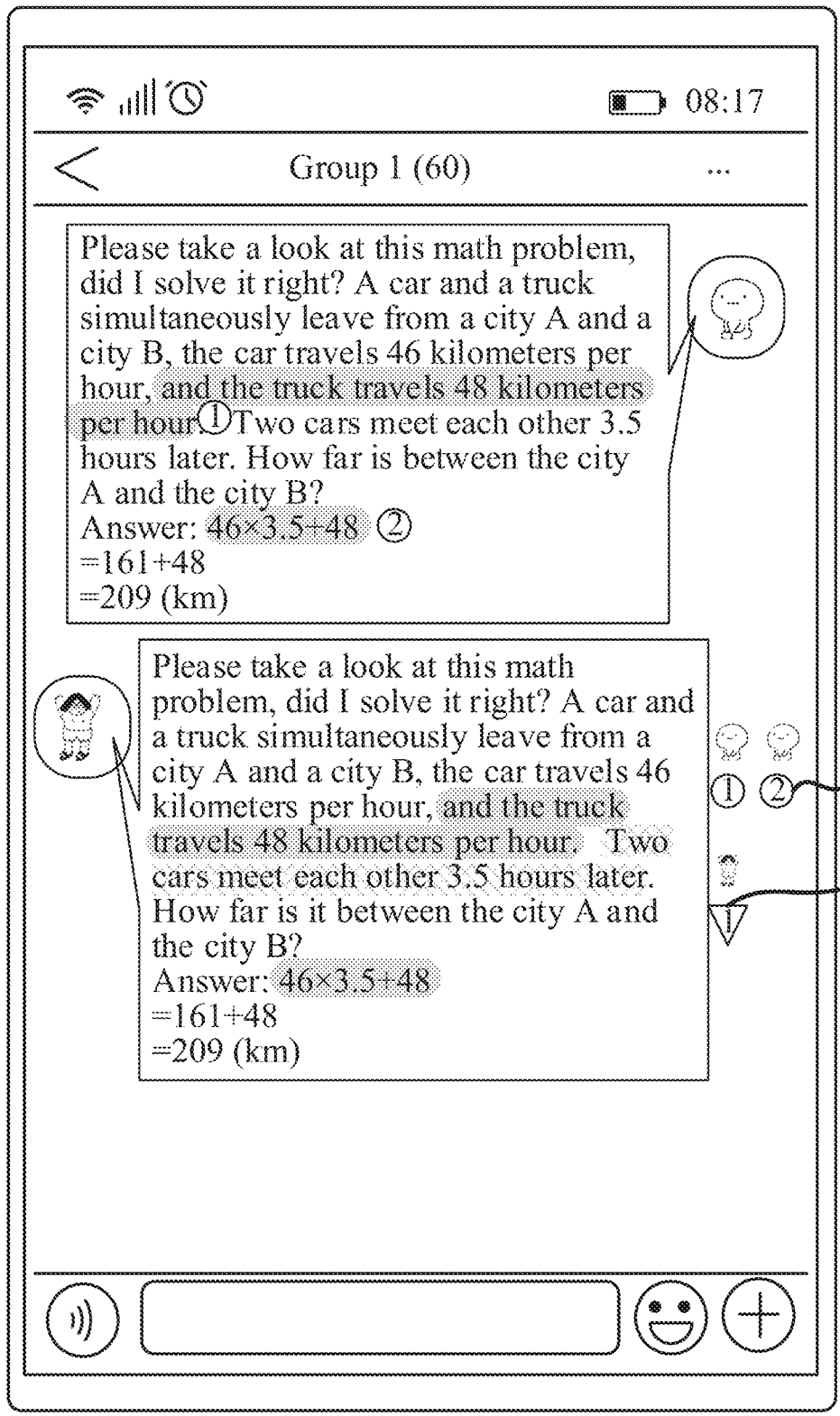
FIG. 10 is an eighth schematic diagram of a display interface of a message processing method according to an embodiment of the present application.

In an example, through the eighth input, the second user may display the second reply identifier and the first reply identifier in the third message in different areas. For example, as shown in FIG. 10, a first reply identifier 1001 and a second reply identifier 1002 are displayed on a right side of the third message respectively, and the first reply identifier 1002 and the second reply identifier 1002 are located in different areas, which is convenient for the user to distinguish. The first reply identifier 1001 is separately located under an avatar of a first user, representing that the first reply identifier 1001 is a message output by the first user through the first message processing apparatus; and the second reply identifier 1002 is separately located under an avatar of a second user, representing that the second reply identifier 1002 is a message output by the second user through the second message processing apparatus.

In this way, the second message processing apparatus displays the first reply identifier and the second reply identifier differently. Further, it is convenient for the user to know that reply messages of different users are output by different users, so that the user may quickly know reply content of different users to different message segments as required, thereby improving the conversation efficiency.

Figure 11:
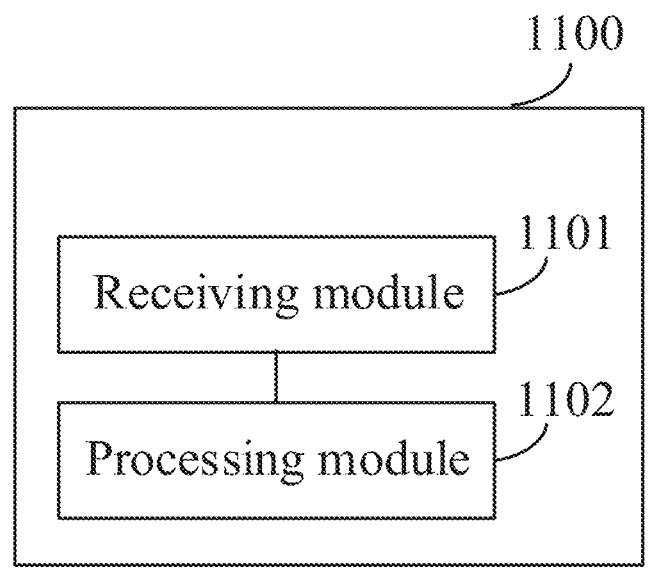
FIG. 11 is a schematic diagram of a structure of a first message processing apparatus according to an embodiment of the present application.

As shown in FIG. 11, embodiments of this application provide a first message processing apparatus 1100. The apparatus 1100 includes: a receiving module 1101 and a processing module 1102, where the receiving module 1101 is configured to receive, when a communication interface displays a first message, a first input performed by a first user on the first message; and a processing module 1102 is configured to display, in response to the first input received by the receiving module 1101, a second message on the communication interface, where the second message includes the first message and a reply message quoting a first message segment in the first message.

In some implementations, in the embodiments of this application, the receiving module 1101 is further configured to receive a second input performed by a user on M first message segments in the first message; and the processing module 1102 is further configured to display, in response to the second input, M first reply identifiers at a preset position on the communication interface, where the first reply identifiers are used to indicate a reply message quoting one first message segment, where M is a positive integer.

In some implementations, the communication interface further includes a message input window, and the receiving module 1101 is further configured to receive a first sub input performed by the first user on the $i^{th}$ first message segment in the first message; the processing module 1102 is further configured to update, in response to the $i^{th}$ sub input, the $i^{th}$ first message segment to a selected state; the receiving module 1101 is further configured to receive a second sub input performed by the first user on the message input window, where the second sub input is used to input a reply message; and the processing module 1102 is further configured to generate, in response to the second sub input, the $i^{th}$ first reply identifier based on the reply message input performed by the second sub input and the $i^{th}$ first message segment, where i is a positive integer, and i≤M.

In some implementations, in the embodiments of this application, the receiving module 1101 is further configured to receive a third input performed by the first user, where the third input is used to indicate that reply messages of the M first message segment have been edited; and the processing module 1102 is further configured to generate, in response to the third input, a second message according to the first message and the M first reply identifiers.

In some implementations, the receiving module 1101 is further configured to receive a fourth input performed by the first user; and the processing module 1102 is further configured to determine, in response to the fourth input, a first display attribute of the second message based on an attribute option selected by the fourth input, where the first display attribute includes: the second message is visible to preset members among group members in the target group, or the second message is visible to all group members in the target group.

In some implementations, the receiving module 1101 is further configured to receive a fifth input performed by first user on a target message segment among the M first message segments; when the second message includes the first reply identifier, the processing module 1102 is further configured to determine, in response to the fifth input, a second display attribute of a first target reply identifier corresponding to the target message segment; or when the second message includes message content of the reply message quoting the first message segment, the processing module 1102 is further configured to determine, in response to the fifth input, a second display attribute of message content of a reply message corresponding to the target message segment, where the second display attribute includes: the first target reply identifier or the message content of the reply message is visible to the preset members among the group members in the target group, or the first target reply identifier or the message content of the reply message is visible to all the group members in the target group.

In some implementations, the receiving module 1101 is further configured to receive a sixth input performed by the first user on the first reply identifier; and the processing module 1102 is further configured to display, in response to the sixth input, message content of a reply message indicated by the first reply identifier in a first area of the second message.

In some implementations, a first message segment in the second message is a first display mode, and the first display mode is used to indicate that the first message segment is quoted; and a second area of the second message further includes the message content of the reply message quoting the first message segment.

The first message processing apparatus 1100 in the embodiments of this application may be an apparatus, and may also be a component in a terminal, an integrated circuit, or a chip. The apparatus may be a mobile electronic device, or may be a non-mobile electronic device. For example, the mobile electronic device may be a mobile phone, a tablet computer, a notebook computer, a handheld computer, a vehicle-mounted electronic device, a wearable device, a Ultra-Mobile Personal Computer (UMPC), a netbook, a Personal Digital Assistant (PDA), or the like. The non-mobile terminal may be a server, a Network Attached Storage (NAS), a personal computer, a television, a cash machine, a self-service machine, or the like, which is not specifically limited in the embodiments of this application.

The first message processing apparatus 1100 in the embodiments of this application may be an apparatus having an operating system. The operating system may be an Android operating system, may be an iOS operating system, and may further be another operating system, which is not specifically limited in this embodiment of this application.

The message processing apparatus 1100 provided in the embodiments of this application may implement various processes of the message processing method embodiments in FIG. 1 to FIG. 6B, which will not be described in detail herein again to avoid repetition.

Figure 12:
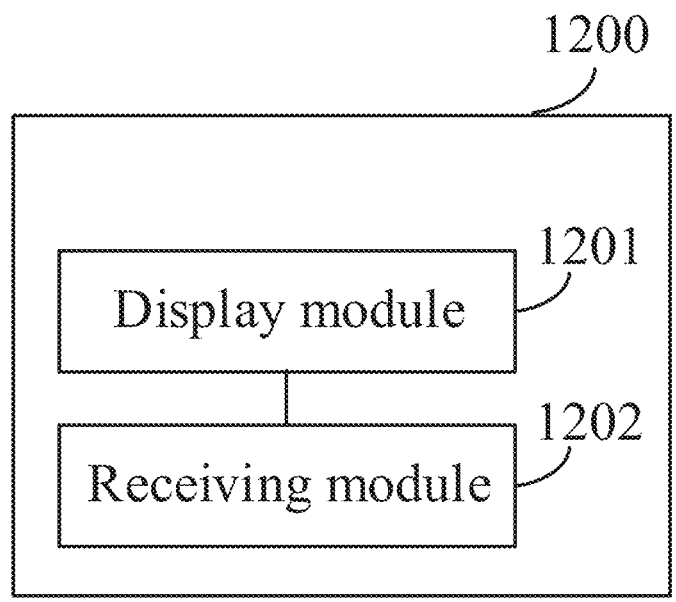
FIG. 12 is a schematic diagram of a structure of a second message processing apparatus according to an embodiment of the present application.

As shown in FIG. 12, the embodiments of this application further provide a second message processing apparatus 1200. The apparatus 1200 includes: a display module 1201 and a receiving module 1202. The display module 1201 is configured to display a second message on a communication interface, where the second message is a message sent by a first message processing apparatus; and the receiving module 1202 is configured to receive, when the second message includes M reply identifiers, a seventh input performed by a second user on one first reply identifier among the M reply identifiers, where the display module 1201 is further configured to display, in response to the seventh input received by the receiving module, message content of a reply message indicated by the first reply identifier, where M is a positive integer, the reply identifier is used to indicate a reply message quoting one message segment, and the first reply identifier is used to indicate a reply message quoting a first message segment.

In some implementations, in the embodiments of this application, the receiving module 1202 is further configured to receive an eighth input performed by the second user on the second message; and the display module 1201 is further configured to display a third message on the communication interface in response to the eighth input, where the third message includes the second message and a reply message quoting a second message segment in the second message.

In some implementations, the third message includes a second reply identifier, the second reply identifier is used to indicate the reply message quoting the second message segment, and the second reply identifier and the first reply identifier are in different display modes.

In some implementations, the receiving module 1202 is further configured to receive a ninth input performed by the second user on the third message; and the display module 1201 is further configured to display, in response to the ninth input, according to a user corresponding to the reply message, the first reply identifier and the second reply identifier in the second message in different areas.

The second message processing apparatus 1200 in the embodiments of this application may be an apparatus, and may also be a component in a terminal, an integrated circuit, or a chip. The apparatus may be a mobile electronic device, or may be a non-mobile electronic device. For example, the mobile electronic device may be a mobile phone, a tablet computer, a notebook computer, a handheld computer, a vehicle-mounted electronic device, a wearable device, an UMPC, a netbook, a PDA, or the like. The non-mobile terminal may be a server, an NAS, a personal computer, a television, a cash machine, a self-service machine, or the like, which is not specifically limited in the embodiments of this application.

The second message processing apparatus 1200 in the embodiments of this application may be an apparatus having an operating system. The operating system may be an Android operating system, may be an iOS operating system, and may further be another operating system, which is not specifically limited in this embodiment of this application.

The message processing apparatus 1200 provided in the embodiments of this application may implement various processes of the method embodiments in FIG. 7 to FIG. 10, which will not be described in detail herein again to avoid repetition.

Figure 13:
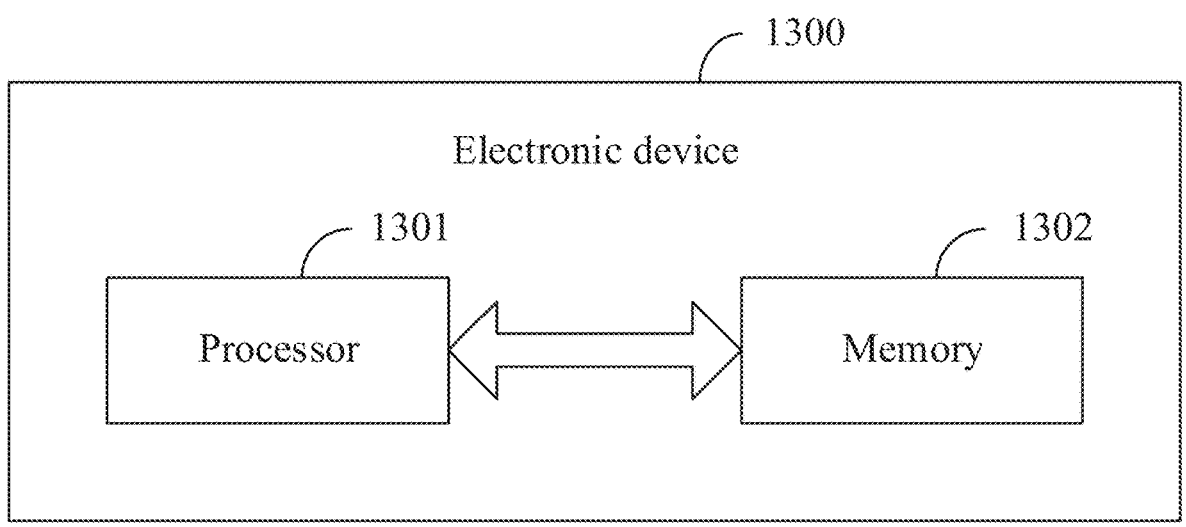
FIG. 13 is a schematic diagram of a structure of an electronic device according to an embodiment of the present application.

As shown in FIG. 13, the embodiments of this application further provide an electronic device 1300.

When the electronic device is a first electronic device, including a processor 1301, a memory 1302, and a program or instructions stored in the memory 1302 and executable on the processor 1301. When the program or instructions is/are executed by the processor 1301, each process of the message processing method embodiment for the first message processing apparatus is implemented, and may implement the same technical effect. To avoid repetition, details are not described herein again.

When the electronic device is a second electronic device, including a processor 1301, a memory 1302, and a program or instructions stored in the memory 1302 and executable on the processor 1301. When the program or instructions is/are executed by the processor 1301, each process of the message processing method embodiment for the second message processing apparatus is implemented, and may implement the same technical effect. To avoid repetition, details are not described herein again.

It is to be noted that the electronic device in the embodiments of this application include the mobile electronic device and the non-mobile electronic device.

Figure 14:
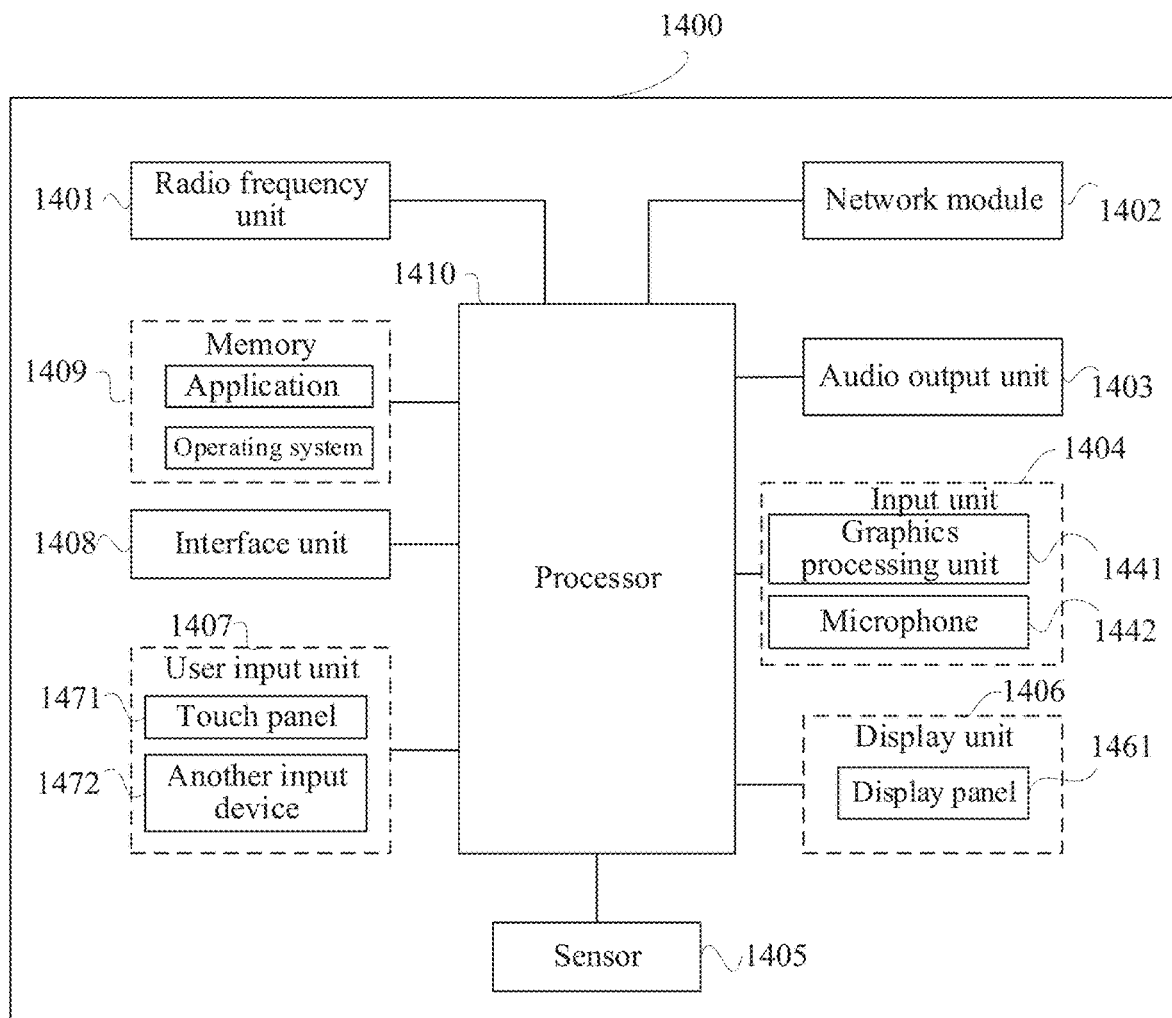
FIG. 14 is a schematic diagram of a structure of hardware of an electronic device according to an embodiment of the present application.

FIG. 14 is a schematic diagram of a hardware structure of an electronic device according to an embodiment of this application.

When the electronic device is a first electronic device, the electronic device 1400 includes, but is not limited to, components such as a radio frequency unit 1401, a network module 1402, an audio output unit 1403, an input unit 1404, a sensor 1405, a display unit 1406, a user input unit 1407, an interface unit 1408, a memory 1409, and a processor 1410.

A person skilled in the art may understand that the electronic device 1400 may further include the power supply (such as a battery) for supplying power to the components. The power supply may be logically connected to the processor 1410 by a power management system, thereby implementing functions such as charging, discharging, and power consumption management by using the power management system.

The user input unit 1407 is configured to receive, when a communication interface displays a first message, a first input performed by a first user on the first message; and the processor 1410 displays, in response to the first input, a second message on the communication interface, where the second message includes the first message and a reply message quoting a first message segment in the first message.

In some implementations, the user input unit 1407 is further configured to receive a second input performed by a user on M first message segments in the first message; and the processor 1410 is further configured to display, in response to the second input, M first reply identifiers at a preset position on the communication interface, where the first reply identifiers are used to indicate a reply message quoting one first message segment, where M is a positive integer.

In some implementations, the user input unit 1407 is further configured to receive a first sub input performed by the first user on the $i^{th}$ first message segment in the first message; the processor 1410 is further configured to update, in response to the $i^{th}$ sub input, the $i^{th}$ first message segment to a selected state; the user input unit 1407 is further configured to receive a second sub input performed by the first user on the message input window, where the second sub input is used to input a reply message; and the processor 1410 is further configured to generate, in response to the second sub input, the $i^{th}$ first reply identifier based on the reply message input performed by the second sub input and the $i^{th}$ first message segment, where i is a positive integer, and i≤M.

In some implementations, the user input unit 1407 is further configured to receive a third input performed by the first user, where the third input is used to indicate that reply messages of the M first message segments have been edited; and the processor 1410 is further configured to generate, in response to the third input, a second message according to the first message and the M first reply identifiers.

In some implementations, the user input unit 1407 is further configured to receive a fourth input performed by the first user; and the processor 1410 is further configured to determine, in response to the fourth input, a first display attribute of the second message based on an attribute option selected by the fourth input, where the first display attribute includes: the second message is visible to preset members among group members in the target group, or the second message is visible to all group members in the target group.

In some implementations, the user input unit 1407 is further configured to receive a fifth input performed by first user on a target message segment among the M first message segments; when the second message includes the first reply identifier, the processor 1410 is further configured to determine, in response to the fifth input, a second display attribute of a first target reply identifier corresponding to the target message segment; or when the second message includes message content of the reply message quoting the first message segment, the processor 1410 is further configured to determine, in response to the fifth input, a second display attribute of message content of a reply message corresponding to the target message segment, where the second display attribute includes: the first target reply identifier or the message content of the reply message is visible to the preset members among the group members in the target group, or the first target reply identifier or the message content of the reply message is visible to all the group members in the target group.

In some implementations, the user input unit 1407 is further configured to receive a sixth input performed by the first user on the first reply identifier; and the processor 1410 is further configured to display, in response to the sixth input, message content of a reply message indicated by the first reply identifier in a first area of the second message.

The first electronic device provided in the embodiments of this application may implement the message processing method used in the first message processing apparatus provided in this application. Therefore, the first electronic device also has all beneficial effects of the message processing method performed by the first message processing apparatus of this application. In the embodiments of this application, after the electronic device displays the first message on the communication interface, the first user may perform an input on the first message. In this way, after receiving the first input performed by the first user on the first message, the electronic device may display the second message (the second message includes content quoting the first message and a reply message to the first message segment in the first message) on the communication interface, so that the first user may reply to part content of the first message (namely, the first message segment) in a targeted manner. In other words, the first user may send a reply to part content of the entire historical message including a large quantity of messages sent by another user in a targeted manner on a communication interface of a conversation. The user who reads the reply message may know an intention of the user replying the message in a timely and accurate manner, and operation efficiency of the user when replying to the message is improved.

When the electronic device is a second electronic device, the electronic device 1400 includes, but is not limited to, components such as a radio frequency unit 1401, a network module 1402, an audio output unit 1403, an input unit 1404, a sensor 1405, a display unit 1406, a user input unit 1407, an interface unit 1408, a memory 1409, and a processor 1410.

A person skilled in the art may understand that the electronic device 1400 may further include the power supply (such as a battery) for supplying power to the components. The power supply may be logically connected to the processor 1410 by a power management system, thereby implementing functions such as charging, discharging, and power consumption management by using the power management system.

The display unit 1406 is configured to display a second message on a communication interface, where the second message is a message sent by a first message processing apparatus; and the user input unit 1407 is configured to receive, when the second message includes M reply identifiers, a seventh input performed by a second user on a first reply identifier among the M reply identifiers, where the display unit 1406 is further configured to display, in response to the seventh input received by the receiving module, message content of a reply message indicated by the first reply identifier, where M is a positive integer, the reply identifier is used to indicate a reply message quoting one message segment, and the first reply identifier is used to indicate a reply message quoting a first message segment.

In some implementations, in the embodiments of this application, the user input unit 1407 is further configured to receive an eighth input performed by the second user on the second message; and the display unit 1406 is further configured to display a third message on the communication interface in response to the eighth input, where the third message includes the second message and a reply message quoting a second message segment in the second message.

In some implementations, in the embodiments of this application, the user input unit 1407 is further configured to receive a ninth input performed by the second user on the third message; and the display unit 1406 is further configured to display, in response to the ninth input, according to a user corresponding to the reply message, the first reply identifier and the second reply identifier in the second message in different areas.

The second electronic device provided in the embodiments of this application may implement the message processing method used in the second message processing apparatus provided in this application. Therefore, the second electronic device also has all beneficial effects of the message processing method performed by the first message processing apparatus of this application. In the embodiments of this application, the electronic device may display the second message without changing the layout and content of the first message by displaying the first reply identifier to indicate the reply message, so that when the second user needs to view the reply message, the second user may perform a seventh input on the first reply identifier. The second message processing apparatus displays the reply message, so that the communication interface may be more tidy and clear. The second user may accurately and timely know reply content of a targeted reply of the first user to the first message, thereby improving conversation efficiency.

It should be understood that, in this embodiment of this application, the input unit 1404 may include a Graphics Processing Unit (GPU) 1441 and a microphone 1442. The graphics processing unit 1441 performs processing on image data of a static picture or a video that is obtained by an image acquisition apparatus (for example, a camera) in a video acquisition mode or an image acquisition mode. The display unit 1406 may include a display panel 1461, and the display panel 1461 may be configured by using a liquid crystal display, an organic light-emitting diode, or the like. The user input unit 1407 includes a touch panel 1471 and another input device 1472. The touch panel 1471 is also referred to as a touchscreen. The touch panel 1471 may include two parts: a touch detection apparatus and a touch controller. The another input device 1472 may include, but not limited to, a physical keyboard, a functional key (such as a volume control key or a switch key), a track ball, a mouse, and a joystick, which are not described herein in detail. The memory 1409 may be configured to store a software program and various data, including but not limited to an application and an operating system. The processor 1410 may integrate an application processor and a modem processor. The application processor mainly processes an operating system, a user interface, an application, and the like. The modem processor mainly processes wireless communication. It may be understood that the foregoing modem may either not be integrated into the processor 1410.

The embodiments of this application further provide a readable storage medium, storing a program or instructions. The program or instructions, when executed by a processor, implements/implement various processes of the embodiments of the message processing method, and may implement the same technical effect, which will not be described in detail herein again to avoid repetition.

The processor is a processor in the electronic device described in the foregoing embodiment. The readable storage medium includes a computer-readable storage medium, for example, a Read-Only Memory (ROM), a Random Access Memory (RAM), a magnetic disk, an optical disc or the like.

The embodiments of this application further provide a chip, including a processor and a communication interface, where the communication interface is coupled to the processor. The processor is configured to run a program or instructions, to implement various processes of embodiments of the message processing method, and may implement the same technical effect, which will not be described in detail herein again to avoid repetition.

It should be understood that the chip mentioned in the embodiments of this application may further be referred to as a system-level chip, a system chip, a chip system, a system on chip, or the like.

It is to be noted that the term "include," "comprise" or any other variation thereof in this specification intends to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one" does not exclude that there are still other same elements in the processes, methods, objects, or apparatuses. In addition, it should be noted that the scope of the methods and apparatuses in the implementations of this application is not limited to performing functions in the order shown or discussed, and may further include performing functions in a substantially simultaneous manner or in a reverse order according to the functions involved, for example, the described methods may be performed in an order different from the order described, and various steps may be added, omitted, or combined. In addition, features described with reference to some examples may be combined in other examples.

Through the foregoing description on the implementations, a person skilled in the art can clearly learn that the foregoing embodiment methods may be implemented by using software in combination with a necessary universal hardware platform. Based on such an understanding, the technical solutions of this application essentially, or the part contributing to the related art, may be presented in the form of a computer software product. The computer software product is stored in a storage medium (for example, a ROM/RAM, a magnetic disk, or an optical disc) including several instructions to enable a terminal (which may be a mobile phone, a computer, a server, a network device, or the like) to perform the methods described in the embodiments of this application.

Although the embodiments of this application have been described above with reference to the accompanying drawings, this application is not limited to the specific implementations described above, and the specific implementations described above are merely exemplary and not limitative. A person of ordinary skill in the art may make various variations under the teaching of this application without departing from the spirit of this application and the protection scope of the claims, and such variations shall all fall within the protection scope of this application.

What is claimed is:

1. A message processing method, performed by a first message processing apparatus, wherein the message processing method comprises:
   when a communication interface displays a first message, receiving a first input performed by a first user on the first message; and
   in response to the first input, displaying a second message on the communication interface, wherein the displayed second message comprises a first message segment annotated in a replicated first message and a reply message displayed in an annotation box associated with the annotated first message segment.

2. The message processing method according to claim 1, wherein after receiving a first input performed by a first user on the first message, the message processing method further comprises:
   receiving a second input performed by a user on M first message segments in the first message; and
   in response to the second input, displaying M first reply identifiers at a preset position on the communication interface, wherein each of the M first reply identifiers is used to indicate one of reply messages quoting one of the M first message segments, wherein M is a positive integer.

3. The message processing method according to claim 2, wherein the communication interface further comprises a message input window, and receiving a second input performed by a user on M first message segments in the first message comprises:
   receiving a first sub input performed by the first user on the $i^{th}$ first message segment in the first message;
   in response to the $i^{th}$ sub input, updating the $i^{th}$ first message segment to a selected state;
   receiving a second sub input performed by the first user on the message input window, wherein the second sub input is used to input a reply message; and
   in response to the second sub input, generating the $i^{th}$ first reply identifier based on the reply message input performed by the second sub input and the $i^{th}$ first message segment, wherein i is a positive integer, and i≤M.

4. The message processing method according to claim 2, wherein before displaying a second message on the communication interface, the message processing method further comprises:
   receiving a third input performed by the first user, wherein the third input is used to indicate that the reply messages of the M first message segments have been edited; and
   in response to the third input, generating the second message according to the first message and the M first reply identifiers.

5. The message processing method according to claim 4, wherein the communication interface is a group conversation interface of a target group, and after generating the second message, the message processing method further comprises:
   receiving a fourth input performed by the first user; and
   in response to the fourth input, determining a first display attribute of the second message based on an attribute option selected by the fourth input, wherein the first display attribute comprises: the second message is visible to preset members among group members in the target group, or the second message is visible to all group members in the target group.

6. The message processing method according to claim 4, wherein the communication interface is a group conversation interface of a target group, and after generating the second message, the message processing method further comprises:
   receiving a fifth input performed by first user on a target message segment among the M first message segments;
   when the second message comprises the first reply identifier, in response to the fifth input, determining a second display attribute of a first target reply identifier corresponding to the target message segment; and
   when the second message comprises message content of the reply message quoting the first message segment, in response to the fifth input, determining a second display attribute of the message content of the reply message corresponding to the target message segment, wherein the second display attribute comprises: the first target reply identifier or the message content of the reply message is visible to preset members among group members in the target group, or the first target reply identifier or the message content of the reply message is visible to all group members in the target group.

7. The message processing method according to claim 2, further comprising:
   receiving a sixth input performed by the first user on the first reply identifier; and
   in response to the sixth input, displaying message content of the reply message indicated by the first reply identifier in a first area of the second message.

8. The message processing method according to claim 1, wherein when the second message comprises the message content of the reply message quoting the first message segment,
   the mode of directly displaying the reply message is a first display mode, and the first display mode is used to indicate that the first message segment is quoted; and
   the message content of the reply message quoting the first message segment is displayed in a second area of the second message.

9. An electronic device, comprising a processor and a memory storing a program or an instruction that is capable of running on the processor, wherein the program or the instruction, when executed by the processor, causes the electronic device to perform:

when a communication interface displays a first message, receiving a first input performed by a first user on the first message; and in response to the first input, displaying a second message on the communication interface, wherein the displayed second message comprises a first message segment annotated in a replicated first message and a reply message displayed in an annotation box associated with the annotated first message segment.

10. The electronic device according to claim 9, wherein after receiving a first input performed by a first user on the first message, the program or the instruction, when executed by the processor, causes the electronic device to further perform:

receiving a second input performed by a user on M first message segments in the first message; and in response to the second input, displaying M first reply identifiers at a preset position on the communication interface, wherein each of the M first reply identifiers is used to indicate one of reply messages quoting one of the M first message segments, wherein M is a positive integer.

11. The electronic device according to claim 10, wherein the communication interface further comprises a message input window, and the receiving a second input performed by a user on M first message segments in the first message comprises:

receiving a first sub input performed by the first user on the $i^{th}$ first message segment in the first message;

in response to the $i^{th}$ sub input, updating the $i^{th}$ first message segment to a selected state;

receiving a second sub input performed by the first user on the message input window, wherein the second sub input is used to input a reply message; and in response to the second sub input, generating the $i^{th}$ first reply identifier based on the reply message input performed by the second sub input and the $i^{th}$ first message segment, wherein i is a positive integer, and i≤M.

12. The electronic device according to claim 10, wherein before displaying a second message on the communication interface, the program or the instruction, when executed by the processor, causes the electronic device to further perform:

receiving a third input performed by the first user, wherein the third input is used to indicate that the reply messages of the M first message segments have been edited; and in response to the third input, generating the second message according to the first message and the M first reply identifiers.

13. The electronic device according to claim 12, wherein the communication interface is a group conversation interface of a target group, and after generating the second message, the program or the instruction, when executed by the processor, causes the electronic device to further perform:

receiving a fourth input performed by the first user; and in response to the fourth input, determining a first display attribute of the second message based on an attribute option selected by the fourth input, wherein the first display attribute comprises: the second message is visible to preset members among group members in the target group, or the second message is visible to all group members in the target group.

14. The electronic device according to claim 12, wherein the communication interface is a group conversation interface of a target group, and after generating the second message, the program or the instruction, when executed by the processor, causes the electronic device to further perform:

receiving a fifth input performed by first user on a target message segment among the M first message segments;

when the second message comprises the first reply identifier, in response to the fifth input, determining a second display attribute of a first target reply identifier corresponding to the target message segment; and when the second message comprises message content of the reply message quoting the first message segment, in response to the fifth input, determining a second display attribute of the message content of the reply message corresponding to the target message segment, wherein the second display attribute comprises: the first target reply identifier or the message content of the reply message is visible to preset members among group members in the target group, or the first target reply identifier or the message content of the reply message is visible to all group members in the target group.

15. The electronic device according to claim 10, wherein the program or the instruction, when executed by the processor, causes the electronic device to further perform:

receiving a sixth input performed by the first user on the first reply identifier; and in response to the sixth input, displaying message content of the reply message indicated by the first reply identifier in a first area of the second message.

16. The electronic device according to claim 9, wherein when the second message comprises the message content of the reply message quoting the first message segment, the mode of directly displaying the reply message is a first display mode, and the first display mode is used to indicate that the first message segment is quoted; and the message content of the reply message quoting the first message segment is displayed in a second area of the second message.

* * * * *